US011432130B2

(12) United States Patent
Jung et al.

(10) Patent No.: US 11,432,130 B2
(45) Date of Patent: Aug. 30, 2022

(54) METHOD AND APPARATUS FOR TRANSMITTING OR RECEIVING DATA IN WIRELESS COMMUNICATION SYSTEM

(71) Applicant: Samsung Electronics Co., Ltd., Suwon-si (KR)

(72) Inventors: Sangyeob Jung, Suwon-si (KR); Soenghun Kim, Suwon-si (KR); Sangbum Kim, Suwon-si (KR); Hyunjeong Kang, Suwon-si (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/264,517

(22) PCT Filed: Aug. 16, 2019

(86) PCT No.: PCT/KR2019/010408
§ 371 (c)(1),
(2) Date: Jan. 29, 2021

(87) PCT Pub. No.: WO2020/036454
PCT Pub. Date: Feb. 20, 2020

(65) Prior Publication Data
US 2021/0297841 A1 Sep. 23, 2021

(30) Foreign Application Priority Data

Aug. 17, 2018 (KR) ......................... 10-2018-0096132

(51) Int. Cl.
*H04W 4/90* (2018.01)
*H04W 4/029* (2018.01)
(Continued)

(52) U.S. Cl.
CPC ............. *H04W 4/90* (2018.02); *H04W 4/021* (2013.01); *H04W 4/027* (2013.01); *H04W 4/029* (2018.02);
(Continued)

(58) Field of Classification Search
CPC ....... H04W 4/90; H04W 4/021; H04W 4/027; H04W 4/029; H04W 4/12; H04W 4/40;
(Continued)

(56) References Cited

U.S. PATENT DOCUMENTS 10,149,210 B2 12/2018 Lim et al.
10,681,501 B2 6/2020 Byun et al.
(Continued)

FOREIGN PATENT DOCUMENTS

JP 2013-125347 A 6/2013
KR 10-2016-0026503 A 3/2016
(Continued)

OTHER PUBLICATIONS

International Search Report dated Nov. 27, 2019, issued in International Patent Application No. PCT/KR2019/010408.
(Continued)

*Primary Examiner* — Michael Y Mapa
(74) *Attorney, Agent, or Firm* — Jefferson IP Law, LLP

(57) ABSTRACT

Provided are a method and apparatus for transmitting or receiving data in a wireless communication system. An operating method of a base station for transmitting and receiving pedestrian-to-vehicle (P2V) data includes: identifying whether a vehicle user equipment (UE) enters a preset dangerous area; when it is identified that the vehicle UE enters the dangerous area, transmitting a message related to the dangerous area to a pedestrian UE (P-UE); receiving, from the P-UE, a request for allocation of sidelink resources for transmitting and receiving P2V data to and from the
(Continued)

vehicle UE; and allocating the sidelink resources to the P-UE.

15 Claims, 17 Drawing Sheets

(51) Int. Cl.
*H04W 4/40* (2018.01)
*H04W 4/021* (2018.01)
*H04W 4/02* (2018.01)
*H04W 4/12* (2009.01)
*H04W 68/00* (2009.01)

(52) U.S. Cl.
CPC .............. *H04W 4/12* (2013.01); *H04W 4/40* (2018.02); *H04W 68/005* (2013.01)

(58) Field of Classification Search
CPC ..... H04W 68/005; H04W 4/14; H04W 64/00; H04W 72/02; H04W 72/042; H04W 76/23; H04W 68/00; H04W 72/0406; H04W 92/18; H04W 36/0011; H04W 36/08; H04W 72/048
USPC .......... 370/329; 455/404.1–404.2, 456.1–457
See application file for complete search history.

(56) References Cited

U.S. PATENT DOCUMENTS

| | | | |
|---|---|---|---|
| 10,911,915 B2 | 2/2021 | Woo et al. | |
| 2014/0066097 A1* | 3/2014 | Kolodziej | H04W 4/023 455/456.3 |
| 2018/0035320 A1 | 2/2018 | Drazynski et al. | |
| 2018/0042039 A1* | 2/2018 | Senba | H04W 4/029 |
| 2018/0048994 A1 | 2/2018 | Kwon et al. | |
| 2018/0302752 A1* | 10/2018 | Ueno | H04W 4/44 |
| 2018/0310147 A1* | 10/2018 | Kim | H04W 68/005 |
| 2019/0222983 A1* | 7/2019 | Adachi | H04W 8/005 |
| 2020/0053553 A1 | 2/2020 | Adachi et al. | |
| 2020/0112977 A1 | 4/2020 | Lee et al. | |
| 2020/0260496 A1 | 8/2020 | Jin et al. | |

FOREIGN PATENT DOCUMENTS

| | | |
|---|---|---|
| KR | 10-2018-0049709 A | 5/2018 |
| KR | 10-2018-0069476 A | 6/2018 |
| KR | 10-2019-0036251 A | 4/2019 |
| WO | 2016/200213 A1 | 12/2016 |
| WO | 2017/048109 A1 | 3/2017 |
| WO | 2017/080706 A1 | 5/2017 |
| WO | 2017/134986 A1 | 8/2017 |
| WO | 2018/143416 A1 | 8/2018 |

OTHER PUBLICATIONS

Written Opinion dated Nov. 27, 2019, issued in International Patent Application No. PCT/KR2019/010408.
Huawei et al: "TS 36.300 Running CR for eV2X", 3GPP TSG-RAN WG2 Meeting #101 bis, Sanya, China, Apr. 16-20 2018, R2-1804642, Apr. 6, 2018, XP051415357.
LG Electronics Inc:"Potential enhancements for V2P",3GPP DRAFT; 3GPP TSG-RAN WG2 #94 Nanjing, China, May 23-27, 2016, R2-164080, May 14, 2016, XP051095291.
Extended European Search Report dated Sep. 3, 2021, issued in European Patent Application No. 19850417.7-1213.
Korean Office Action dated Feb. 17, 2022, issued in Korean Application No. 10-2018-0096132.

\* cited by examiner

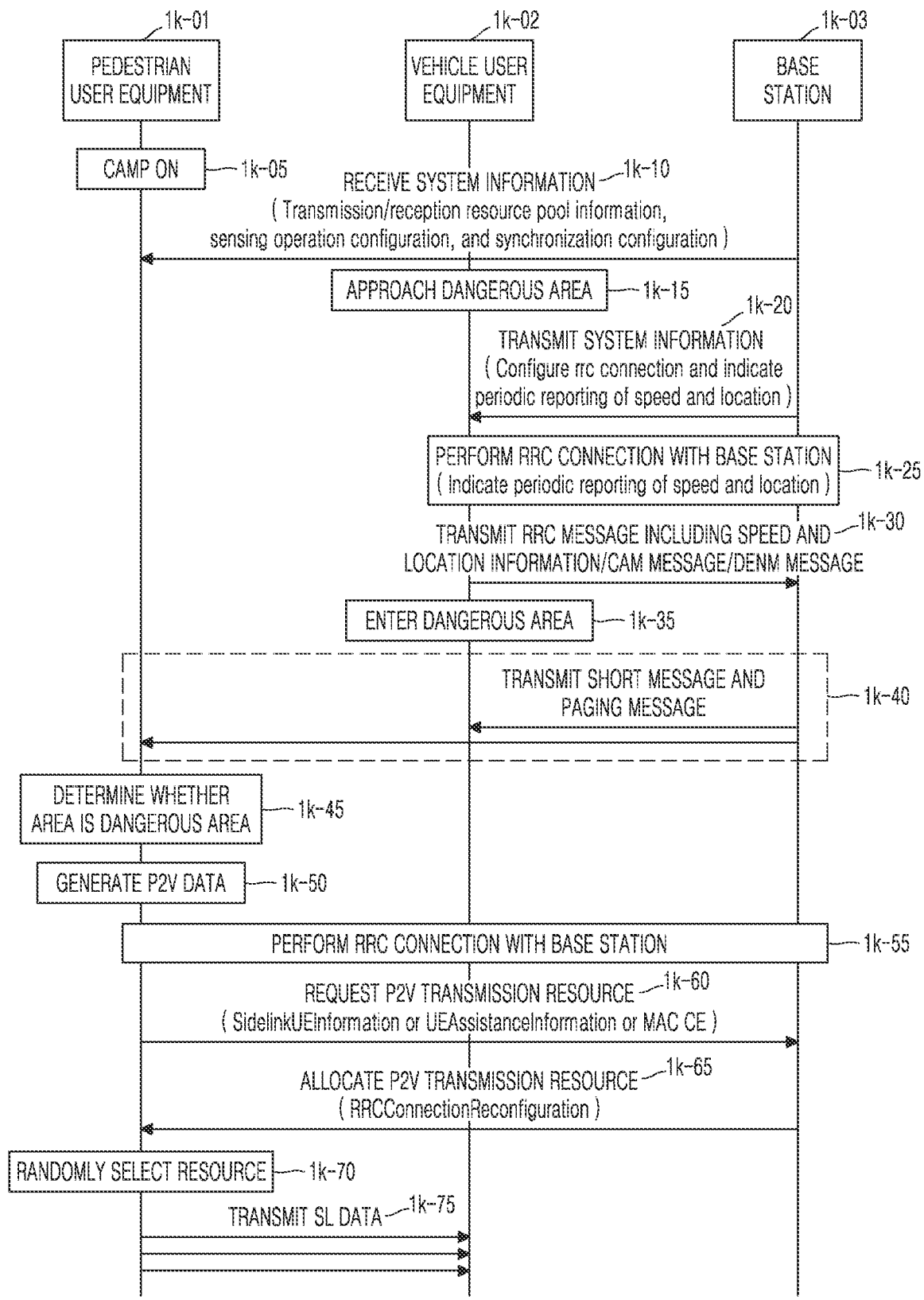

(a) RRCConnectionReconfiguration (b) RRCReconfiguration

METHOD AND APPARATUS FOR TRANSMITTING OR RECEIVING DATA IN WIRELESS COMMUNICATION SYSTEM

TECHNICAL FIELD

The disclosure relates to a method and apparatus for transmitting and receiving data in a wireless communication system.

BACKGROUND ART

To meet the increase in demand with respect to wireless data traffic after the commercialization of $4^{th}$ generation (4G) communication systems, considerable efforts have been made to develop pre-$5^{th}$ generation (5G) communication systems or 5G communication systems. For this reason, 5G or pre-5G communication systems are called "beyond 4G network" communication systems or "post long-term evolution (post-LTE)" systems. In order to achieve a high data rate, consideration is given to implementing 5G communication systems in millimeter wave (mmWave) frequency bands (e.g., 60 GHz bands). To reduce path loss of radio waves and increase a transmission distance of radio waves in the ultra-high frequency band, for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks, for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and reception interference cancellation have been developed. In addition, for 5G communication systems, advanced coding modulation (ACM) technologies, such as hybrid frequency-shift keying (FSK) and quadrature amplitude modulation (QAM) (FQAM) and sliding window superposition coding (SWSC), and advanced access technologies, such as filter bank multi-carrier (FBMC), non-orthogonal multiple access (NOMA), and sparse code multiple access (SCMA), have been developed.

The Internet has evolved from a human-based connection network whereby humans generate and consume information to the Internet-of-things (IoT) whereby distributed elements such as objects exchange information with each other to process the information. Internet-of-Everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required. In recent years, technologies related to sensor networks for connecting objects, machine-to-machine (M2M) communication, and machine-type communication (MTC) have been studied. In an IoT environment, intelligent Internet technology (IT) services may be provided to collect and analyze data obtained from connected objects to generate new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Accordingly, various attempts are being made to apply 5G communication systems to the IoT network. For example, technology such as a sensor network, M2M communication, or MTC is implemented by 5G communication technology such as beam-forming, MIMO, or array antenna. The application of a cloud RAN as big data processing technology may also be considered as an example of convergence of 5G technology and IoT technology.

Because various services may be provided due to the aforementioned technical features and the development of mobile communication systems, methods for effectively providing these services are required.

DESCRIPTION OF EMBODIMENTS

Solution to Problem

According to an embodiment of the disclosure, an operating method of a base station for transmitting and receiving pedestrian-to-vehicle (P2V) data includes: identifying whether a vehicle user equipment (UE) enters a preset dangerous area; when it is identified that the vehicle UE enters the dangerous area, transmitting a message related to the dangerous area to a pedestrian UE (P-UE); receiving, from the P-UE, a request for allocation of sidelink resources for transmitting and receiving P2V data to and from the vehicle UE; and allocating the sidelink resources to the P-UE.

BRIEF DESCRIPTION OF DRAWINGS

FIG. 1K illustrates a method, performed by a pedestrian UE, of transmitting and receiving a V2P signal with the assistance of a base station/vehicle UE to reduce power consumption of the pedestrian UE in V2P communication, according to an embodiment of the disclosure.

BEST MODE

Figure 1A:
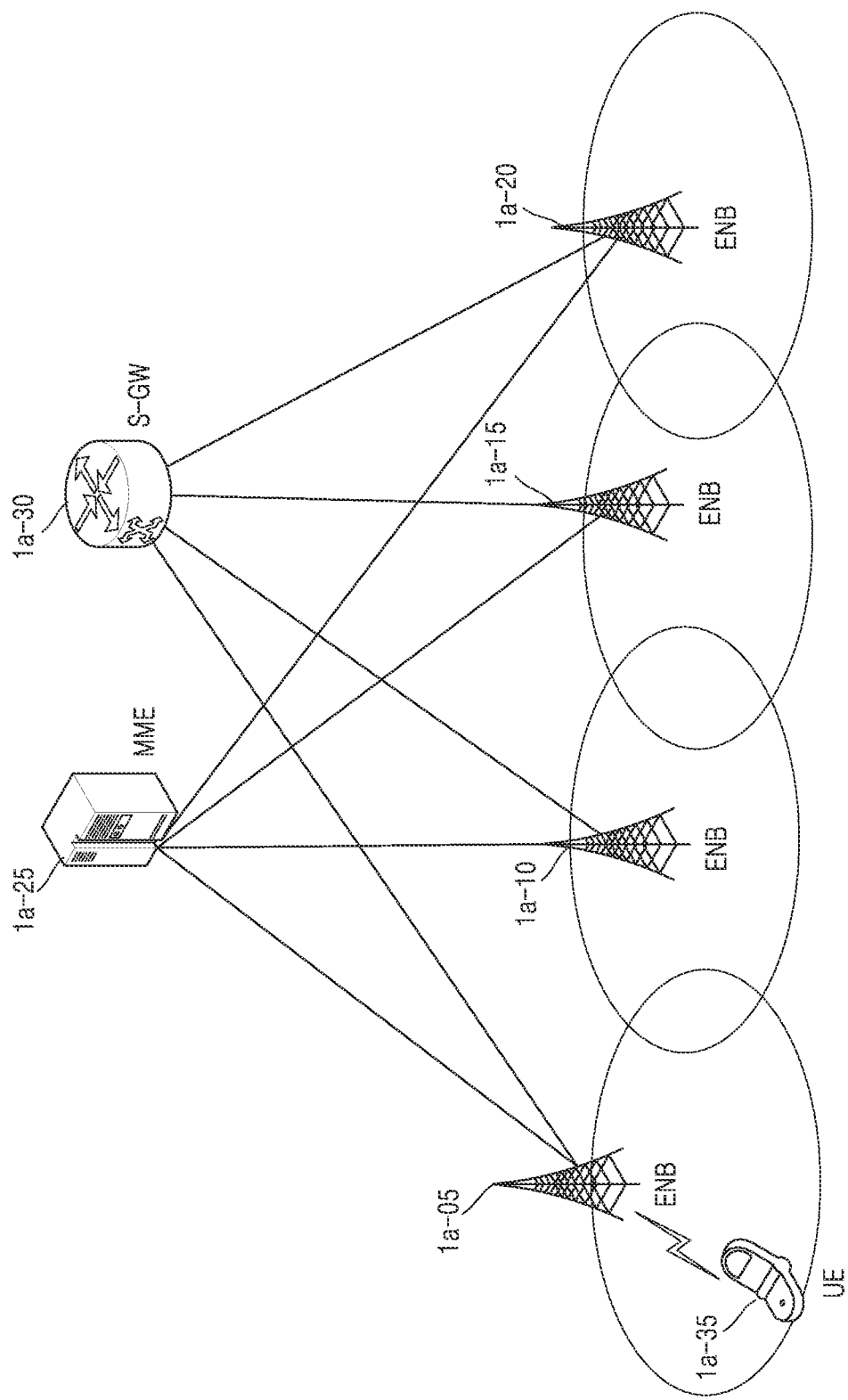
FIG. 1A illustrates a structure of a long-term evolution (LTE) system, according to an embodiment of the disclosure.

According to an embodiment of the disclosure, an operating method of a base station for transmitting and receiving pedestrian-to-vehicle (P2V) data includes: identifying whether a vehicle user equipment (UE) enters a preset dangerous area; when it is identified that the vehicle UE enters the dangerous area, transmitting a message related to the dangerous area to a pedestrian UE (P-UE); receiving, from the P-UE, a request for allocation of sidelink resources for transmitting and receiving P2V data to and from the vehicle UE; and allocating the sidelink resources to the P-UE.

According to an embodiment of the disclosure, the message related to the dangerous area may include a paging message including at least one of information indicating that the P-UE is located in the dangerous area or instructing the P-UE to transmit the P2V data, or information about a location of the dangerous area.

According to an embodiment of the disclosure, the message related to the dangerous area may include a short message including information indicating that the P-UE is located in the dangerous area or instructing the P-UE to transmit the P2V data.

According to an embodiment of the disclosure, the message related to the dangerous area may include a short message including information indicating that the P-UE is located in the dangerous area or instructing the P-UE to transmit the P2V data, and a paging message including information about a location of the dangerous area.

According to an embodiment of the disclosure, the operating method of the base station for transmitting and receiving the P2V data may further include: when the vehicle UE is located within a preset distance from the dangerous area, requesting the vehicle UE to report at least one of information about a location of the vehicle UE or information about a speed of the vehicle UE; and receiving, from the vehicle UE, the at least one of the information about the location of the vehicle UE or the information about the speed of the vehicle UE, wherein the identifying of whether the vehicle UE enters the dangerous area may include, based on the at least one of the information about the location of the vehicle UE or the information about the vehicle UE, identifying whether the vehicle UE enters the dangerous area.

According to an embodiment of the disclosure, an operating method of a pedestrian user equipment (P-UE) for transmitting and receiving pedestrian-to-vehicle (P2V) data includes: when it is identified that a vehicle UE enters a preset dangerous area, receiving a message related to the dangerous area from a base station; based on the message related to the dangerous area, generating P2V data to be transmitted to the vehicle UE; transmitting, to the base station, a request for allocation of sidelink resources for transmitting and receiving the P2V data; receiving the sidelink resources allocated from the base station; and transmitting the P2V data to the vehicle UE on the sidelink resources.

According to an embodiment of the disclosure, the message related to the dangerous area may include a paging message including at least one of information indicating that the P-UE is located in the dangerous area or instructing the P-UE to transmit the P2V data, or information about a location of the dangerous area.

According to an embodiment of the disclosure, the message related to the dangerous area may include a short message including information indicating that the P-UE is located in the dangerous area or instructing the P-UE to transmit the P2V data.

According to an embodiment of the disclosure, the message related to the dangerous area may include a short message including information indicating that the P-UE is located in the dangerous area or instructing the P-UE to transmit the P2V data, and a paging message including information about a location of the dangerous area.

According to an embodiment of the disclosure, in the operating method of the P-UE for transmitting and receiving the P2V data, the generating of the P2V data to be transmitted to the vehicle UE may include: based on the message related to the dangerous area, determining whether the P-UE is located in the dangerous area; and based on the determining, generating the P2V data to inform the vehicle UE of presence of the P-UE.

According to an embodiment of the disclosure, the operating method of the P-UE for transmitting and receiving the P2V data may further include selecting a sidelink resource to transmit the P2V data from among the allocated sidelink resources, wherein the transmitting of the P2V data may include transmitting the P2V data to the vehicle UE on the selected sidelink resource.

According to an embodiment of the disclosure, a base station for transmitting and receiving pedestrian-to-vehicle (P2V) data includes: a transceiver; and at least one processor connected to the transceiver, wherein the at least one processor is configured to: identify whether a vehicle user equipment (UE) enters a preset dangerous area; when it is identified that the vehicle UE enters the dangerous area, transmit a message related to the dangerous area to a pedestrian UE (P-UE); receive, from the P-UE, a request for allocation of sidelink resources for transmitting and receiving P2V data to and from the vehicle UE; and allocate the sidelink resources to the P-UE.

According to an embodiment of the disclosure, the at least one processor may be further configured to: when the vehicle UE is located within a preset distance from the dangerous area, request the vehicle UE to report at least one of information about a location of the vehicle UE or information about a speed of the vehicle UE; receive, from the vehicle UE, the at least one of the information about the location of the vehicle or the information about the speed of the vehicle UE; and based on the at least one of the information about the location of the vehicle or the information about the speed of the vehicle UE, identify whether the vehicle UE enters the dangerous area.

According to an embodiment of the disclosure, a pedestrian user equipment (P-UE) for transmitting and receiving pedestrian-to-vehicle (P2V) data includes: a transceiver; and at least one processor connected to the transceiver, wherein the at least one processor is configured to: when it is identified that a vehicle UE enters a preset dangerous area, receive a message related to the dangerous area from a base station; based on the message related to the dangerous area, generate P2V data to be transmitted to the vehicle UE; transmit, to the base station, a request for allocation of sidelink resources for transmitting and receiving the P2V data; receive the sidelink resources allocated from the base station; and transmit the P2V data to the vehicle UE on the sidelink resources.

According to an embodiment of the disclosure, the at least one processor may be further configured to: select a sidelink resource to transmit the P2V data from among the allocated sidelink resources; and transmit the P2V data to the vehicle UE on the selected sidelink resource.

MODE OF DISCLOSURE

Hereinbelow, an operating principle of the disclosure will be described in detail with reference to the accompanying drawings. In the following descriptions of the disclosure, detailed descriptions of well-known functions or configurations will be omitted because they would unnecessarily obscure the subject matters of the disclosure. Also, terms used below are defined in consideration of functions in the present disclosure, and may have different meanings according to an intention of a user or operator, customs, or the like. Therefore, the terms should be defined based on the whole context of the disclosure.

In this case, it will be understood that each block of process flowcharts and combinations of the flowcharts may be performed by computer program instructions. Because these computer program instructions may be mounted on a processor of a general-purpose computer, special-purpose computer, or other programmable data processing equipment, the instructions executed through a processor of a computer or other programmable data processing equipment may generate a means of performing the functions described in the flowchart block(s). The computer program instructions may be stored in a computer-executable or computer-readable memory capable of directing a computer or another programmable data processing apparatus to implement a function in a particular manner, and thus the instructions stored in the computer-executable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should be noted that in some alternative embodiments, the functions described in the blocks may be performed in an order different from that described herein. For example, two blocks illustrated consecutively may be performed substantially simultaneously or performed in a reverse order according to functions corresponding thereto in some cases.

In this case, the term "unit" used in embodiments set forth herein refers to software or a hardware component, such as a field programmable gate array (FPGA) or an application-specific integrated circuit (ASIC), which performs certain functions. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing 1units (CPUs) in a device or security multimedia card. In an embodiment of the disclosure, a "unit" may include one or more processors.

In the disclosure, a downlink (DL) may mean a wireless transmission path of a signal transmitted from a base station to a terminal, and an uplink (UL) may mean a wireless transmission path of a signal transmitted from a terminal to a base station. Also, hereinbelow, a long-term evolution (LTE) or LTE-A system may be described as an example; however, embodiments of the disclosure may also be applied to other communication systems having similar technical backgrounds or channel types. For example, $5^{th}$ generation mobile communication technology (5G) (or new radio (NR)) developed after LTE-A may be included in systems to which embodiments of the disclosure may be applied, and the following 5G may be a concept including the existing LTE, LTE-A, and other similar services. The disclosure is also applicable to other communication systems by making some modifications therein according to a judgement of those of ordinary skill in the art without greatly departing from the scope of the disclosure.

As used herein, terms used to identify a connection node, terms referring to network entities, terms referring to messages, a term referring to interface between network entities, terms referring to various types of identification information, and the like are examples provided for convenience of explanation. Accordingly, the disclosure is not limited to terms to be described below, and other terms representing objects having the equivalent technical meaning may be used.

In the following description, terms and names defined in the $3^{rd}$ Generation Partnership Project Long Term Evolution (3GPP LTE) standards may be used for convenience of description. However, the disclosure is not limited to those terms and names and may also be similarly applied to systems according to other standards.

Hereinbelow, a base station refers to a subject that allocates a resource to a terminal, and may include at least one of a gNode B, an eNode, a node B, a base station (BS), a radio access unit, a BS controller, or a node in a network. Examples of a terminal may include a user equipment (UE), a mobile station (MS), a cellular phone, a smartphone, a computer, a multimedia system capable of performing a communication function or the like. However, the disclosure is not limited to the above examples.

Particularly, the disclosure may be applied to 3GPP NR (5G mobile communication standards). Also, the disclosure is applicable to intelligent services (e.g., smart home, smart building, smart city, smart car or connected car, health care, digital education, retail, security, and safety services) based on 5G communication technology and IoT technology. In the disclosure, an eNB may be interchangeably used with a gNB for convenience of description. That is, a base station described as the eNB may represent the gNB. Also, the term "terminal" may indicate not only mobile phones, NB-IoT devices, and sensors, but also other wireless communication devices.

Wireless communication systems providing voice-based services are being developed to broadband wireless communication systems providing high-speed and high-quality packet data services according to communication standards such as high speed packet access (HSPA), LTE or evolved universal terrestrial radio access (E-UTRA), LTE-A, LTE-Pro of 3GPP, high rate packet data (HRPD) and ultra mobile broadband (UMB) of 3GPP2, and 802.16e of the Institute of Electrical and Electronics Engineers (IEEE).

As a representative example of the broadband wireless communication system, an LTE system uses orthogonal frequency division multiplexing (OFDM) in a DL and uses single carrier-frequency division multiple access (SC-FDMA) in an UL. The UL may refer to a radio link for transmitting data or a control signal from a terminal (e.g., a UE or a MS) to a base station (e.g., an eNB or a BS), and the downlink may refer to a radio link for transmitting data or a control signal from the base station to the terminal. The above-described multiple access schemes identify data or control information of different users in a manner that time-frequency resources for carrying the data or control information of the users are allocated and managed not to overlap each other, that is, to achieve orthogonality therebetween.

As a future communication system after the LTE system, that is, a 5G communication system, has to be able to freely reflect various requirements of a user and a service provider, and thus, services satisfying various requirements at the same time need to be supported. Services considered for the 5G systems may include enhanced mobile broadband (eMBB), massive machine-type communication (mMTC), and ultra-reliability low-latency communication (URLLC) services.

According to an embodiment of the disclosure, the eMBB may aim to provide an improved data rate than the data rate supported by the existing LTE, LTE-A, or LTE-Pro. For example, in the 5G communication system, the eMBB should be able to provide a peak data rate of 20 Gbps in a downlink and a peak data rate of 10 Gbps in an UL from the viewpoint of one base station. Also, the 5G communication system may have to provide an increased user-perceived data rate of a terminal while providing a peak data rate. In order to satisfy this requirement, the 5G communication system may require the improvement of various transmission/reception technologies including a more improved multi-input multi-output (MIMO) transmission technology.

Also, the 5G communication system may satisfy a required data rate by using a frequency bandwidth wider than 20 MHz in the 3 GHz to 6 GHz or 6 GHz or more frequency band while transmitting signals by using a transmission bandwidth of up to 20 MHz in the 2 GHz band used in the current LTE.

Simultaneously, the mMTC is being considered to support application services such as IoT in 5G communication systems. The mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/$km^2$) in a cell because it is attached to various sensors and various devices to provide communication functions. Also, because a terminal supporting the mMTC is likely to be located in a shadow area failing to be covered by the cell, such as the basement of a building, due to the characteristics of the service, it may require wider coverage than other services provided by the 5G communication systems. The terminal supporting the mMTC should be configured as an inexpensive terminal and requires a very long battery lifetime, such as 10 to 15 years, because it is difficult to frequently replace a battery of the terminal.

Lastly, the URLLC may be used in services for remote control of robots or machinery, industrial automation, unmanned aerial vehicles, remote health care, emergency alerts, and the like, as cellular-based wireless communication services used for mission-critical purposes. Thus, the communication provided by the URLLC may have to provide very low latency (ultra-low latency) and very high reliability (ultra-high reliability). For example, a service supporting the URLLC should satisfy air interface latency smaller than 0.5 milliseconds and at the same time, may have a packet error rate of $10^{-5}$ or less. Thus, for the service supporting the URLLC, the 5G system should provide a smaller transmit time interval (TTI) than other services and simultaneously may have a design requirement for allocating wide resources in frequency bands in order to secure the reliability of communication links.

The three services, that is, eMBB, URLLC, and mMTC, considered in the above-described 5G communication system may be multiplexed in one system and may be transmitted. In this case, different transmission/reception techniques and transmission/reception parameters may be used between services in order to satisfy different requirements of the respective services. However, the above-described mMTC, URLLC, and eMBB are examples of different service types, and service types to which the disclosure is applied are not limited to the above-described examples.

Also, although embodiments of the disclosure will be described below by using an LTE, LTE-A, LTE Pro, or 5G (or NR, next-generation mobile communication) as an example, the embodiments of the disclosure may also be applied to other communication systems having similar technical backgrounds or channel types. Also, the embodiments of the disclosure may also be applied to other communication systems through some modifications without departing from the scope of the disclosure by the judgment of those of ordinary skill in the art.

In describing the disclosure, when the detailed description of the relevant known functions or configurations is determined to unnecessarily obscure the gist of the disclosure, the detailed description thereof may be omitted. Hereinafter, embodiments of the disclosure will be described with reference to the accompanying drawings.

FIG. 1A illustrates a structure of an LTE system, according to an embodiment of the disclosure.

Referring to FIG. 1A, a radio access network of the LTE system may include new-generation base stations (evolved Node Bs) (hereinafter, ENBs, Node Bs, or base stations) 1*a*-05, 1*a*-10, 1*a*-15, and 1*a*-20, a mobility management entity (MME) 1*a*-25, and a serving-gateway (S-GW) 1*a*-30. A user equipment (hereinafter, a UE) 1*a*-35 may access an external network through the ENBs 1*a*-05 to 1*a*-20 and the S-GW 1*a*-30.

In FIG. 1A, the ENBs 1*a*-05 to 1*a*-20 may correspond to the existing Node B of a universal mobile telecommunication system (UMTS). The ENB may be connected to the UE 1*a*-35 through a radio channel and may perform a more complex function than the existing Node B. In the LTE system, all user traffic including real-time services such as Voice over IP (VoIP) through the Internet protocol may be serviced on a shared channel. Thus, an entity for collecting status information such as buffer statuses of UEs, available transmission power statuses, and channel statuses and performing scheduling is required, and such operations may be performed by the ENBs 1*a*-05 to 1*a*-20. One ENB may generally control a plurality of cells. For example, in order to implement a data rate of 100 Mbps, the LTE system may use OFDM as a radio access technology in a 20 MHz bandwidth. Also, an adaptive modulation & coding (AMC) scheme may be applied to determine a modulation scheme and a channel coding rate according to the channel status of the UE. The S-GW 1*a*-30 may be an entity for providing a data bearer and may generate or remove a data bearer under the control of the MME 1*a*-25. The MME may be an entity for performing various control functions as well as a mobility management function for a UE and may be connected to a plurality of BSs.

Figure 1B:
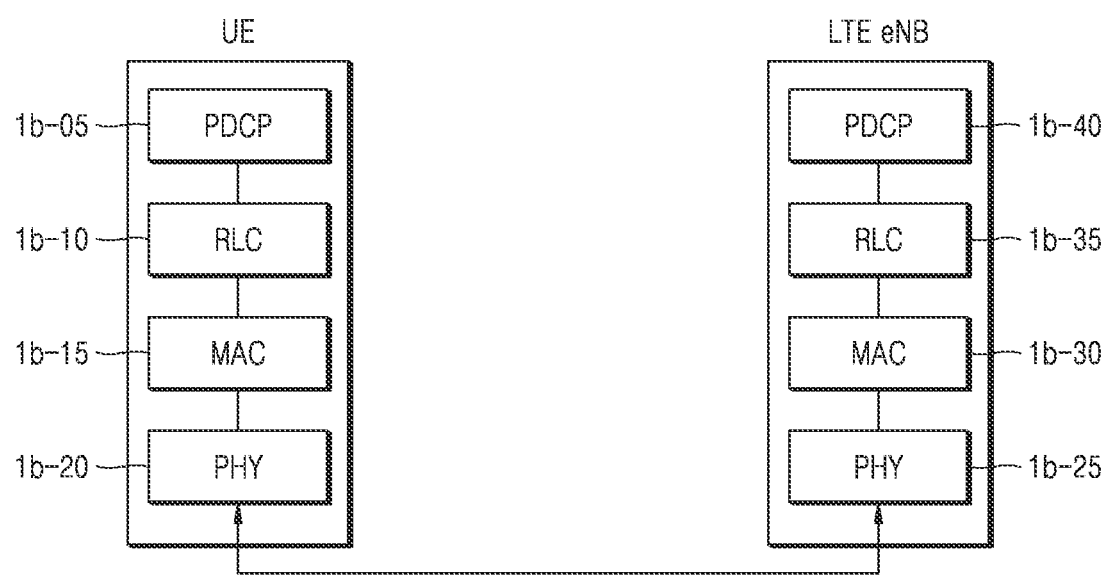
FIG. 1B illustrates a radio protocol architecture in an LTE system, according to an embodiment of the disclosure.

FIG. 1B illustrates a radio protocol architecture in an LTE system, according to an embodiment of the disclosure.

Referring to FIG. 1B, the radio protocol of the LTE system may include packet data convergence protocols (PDCP) 1*b*-05 and 1*b*-40, radio link controls (RLC) 1*b*-10 and 1*b*-35, and medium access controls (MAC) 1*b*-15 and 1*b*-30 in each of a UE and an ENB. The PDCP may perform operations such as IP header compression/decompression. The main functions of the PDCP may be summarized as follows.
  header compression and decompression: ROHC only
  transfer of user data
  sequential transmission (in-sequence delivery of upper layer PDUs at PDCP re-establishment procedure for RLC AM)
  reordering (for split bearers in DC (only support for RLC AM): PDCP PDU routing for transmission and PDCP PDU reordering for reception)
  duplicate detection of lower layer SDUs at PDCP re-establishment procedure for RLC AM
  retransmission of PDCP SDUs at handover and, for split bearers in DC, of PDCP PDUs at PDCP data-recovery procedure, for RLC AM
  ciphering and deciphering
  timer-based SDU discarding in UL The RLCs 1*b*-10 and 1*b*-35 may reconfigure a PDCP packet data unit (PDU) in a suitable size to perform an ARQ operation or the like. The main functions of the RLC may be summarized as follows.
  transfer of upper layer PDUs
  ARQ function (error correction through ARQ (only for AM data transfer))
  concatenation, segmentation and reassembly of RLC SDUs (only for UM and AM data transfer)
  re-segmentation of RLC data PDUs (only for AM data transfer)
  reordering of RLC data PDUs (only for UM and AM data transfer)
  duplicate detection (only for UM and AM data transfer)
  protocol error detection (only for AM data transfer)
  RLC SDU discarding (only for UM and AM data transfer)
  RLC re-establishment The MACs 1*b*-15 and 1*b*-30 may be connected to several RLC layers configured in one UE and may perform an operation of multiplexing RLC PDUs into MAC PDUs and demultiplexing RLC PDUs from MAC PDUs. The main functions of the MAC may be summarized as follows.
  mapping between logical channels and transport channels
  multiplexing/demultiplexing of MAC SDUs belonging to one or different logical channels into/from transport blocks (TB) delivered to/from the physical layer on transport channels
  scheduling information reporting
  HARQ function (error correction through HARQ)
  priority handling between logical channels of one UE
  priority handling between UEs by means of dynamic scheduling
  MBMS service identification
  transport format selection
  padding Physical layers 1*b*-20 and 1*b*-25 may channel-code and modulate upper layer data, generate OFDM symbols, and transmit the same through a radio channel or may demodulate and channel-decode OFDM symbols received through a radio channel and transmit the result thereof to the upper layer.

Figure 1C:
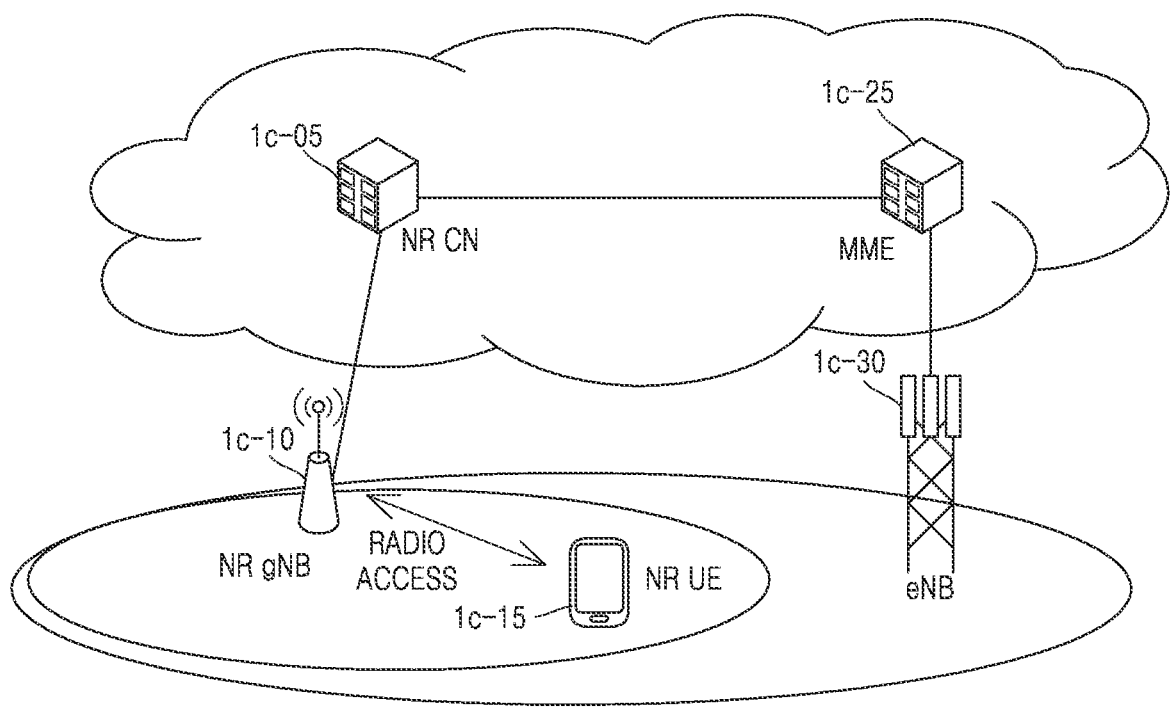
FIG. 1C illustrates a structure of a next-generation mobile communication system, according to an embodiment of the disclosure.

FIG. 1C illustrates a structure of a next-generation mobile communication system, according to an embodiment of the disclosure.

Referring to FIG. 1C, a radio access network of the next-generation mobile communication system (hereinafter, referred to as NR or 5G) may include a next-generation BS (new radio Node B) (hereinafter, referred to as an NR gNB or NR BS) 1*c*-10 and a next-generation radio core network (new radio core network) (hereinafter, referred to as an NR CN)) 1*c*-05. A next-generation radio UE (new radio UE) (hereinafter, referred to as an NR UE or UE) 1*c*-15 may access an external network through the NR gNB 1*c*-10 and the NR CN 1*c*-05.

In FIG. 1C, the NR gNB 1*c*-10 may correspond to an eNB of the existing LTE system. The NR gNB may be connected to the NR UE 1*c*-15 through a radio channel and may provide a better service than the existing Node B. In the NR or 5G system, all user traffic may be serviced on a shared channel. Thus, an entity for collecting status information such as buffer statuses of UEs, available transmission power statuses, and channel statuses and performing scheduling is required, and such operations may be performed by the NB 1*c*-10. One NR gNB may generally control a plurality of cells. In the NR or 5G system, a bandwidth larger than or equal to the current maximum bandwidth may be applied to implement ultra-high-speed data transmission compared to the current LTE. Also, a beamforming technology may be additionally combined by using OFDM as a radio access technology. Also, an AMC scheme may be applied to determine a modulation scheme and a channel coding rate according to a channel status of a UE.

The NR CN 1*c*-05 may perform functions such as mobility support, bearer configuration, and quality of service (QoS) configuration. The NR CN may be an entity for performing various control functions as well as a mobility management function for UE and may be connected to a plurality of base stations. Also, the next generation mobile communication system may also be linked with the existing LTE system, and the NR CN may be connected to an MME 1c-25 through a network interface. The MME may be connected to an eNB 1c-30 that is an existing BS.

Figure 1D:
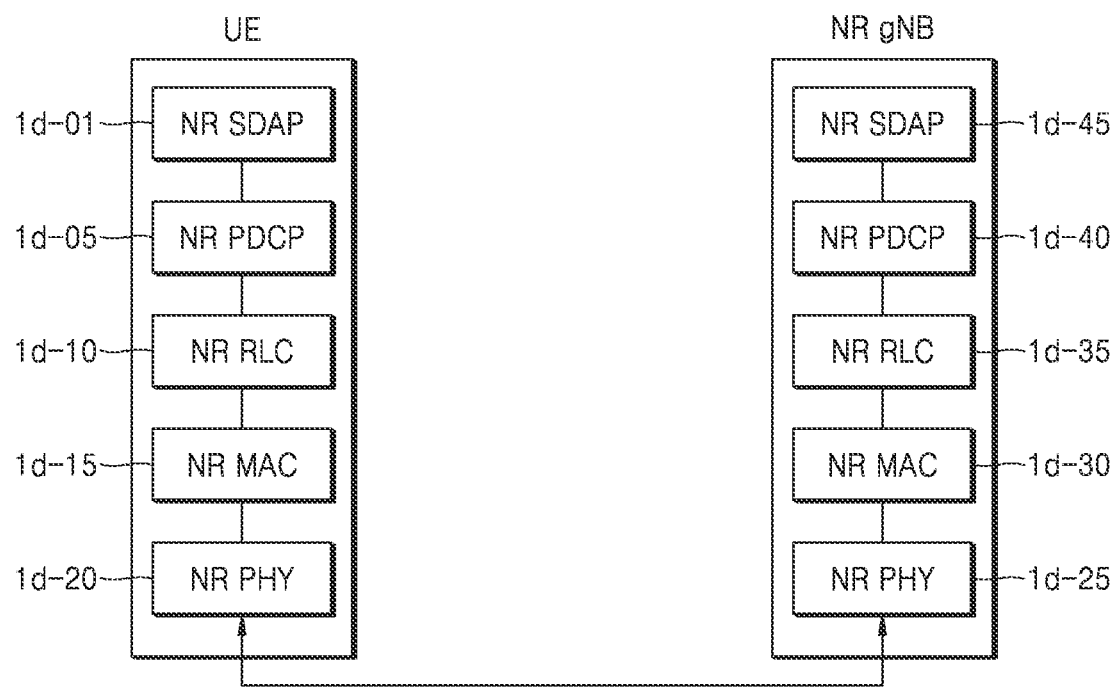
FIG. 1D illustrates a radio protocol architecture of a next-generation mobile communication system, according to an embodiment of the disclosure.

FIG. 1D illustrates a radio protocol architecture of a next-generation mobile communication system, according to an embodiment of the disclosure.

Referring to FIG. 1D, the radio protocol of the next-generation mobile communication system may include NR service data adaptation protocols (SDAPs) 1d-01 and 1d-45, NR PDCPs 1d-05 and 1d-40, NR RLCs 1d-10 and 1d-35, and NR MACs 1d-15 and 1d-30 in each of a UE and an NR gNB.

The main functions of the NR SDAP 1d-01 or 1d-45 may include some of the following functions.
  transfer of user plane data
  mapping between a QoS flow and a DRB for both a DL and an UL
  marking a QoS flow ID in both DL and UL packets
  mapping a reflective QoS flow to a DRB for UL SDAP PDUs As for an SDAP layer, the UE may be configured with a radio resource control (RRC) message for each PDCP layer, for each bearer, or for each logical channel whether to use a header of the SDAP layer or whether to use a function of the SDAP layer. When an SDAP header is configured, a 1-bit non access stratum (NAS) reflective QoS indicator and a 1-bit access stratum (AS) reflective QoS indicator of the SDAP header may indicate the UE to update or reconfigure mapping information between a data bearer and a QoS flow for the UL and the DL. The SDAP header may include QoS flow ID information indicating QoS. QoS information may be used as data processing priority, scheduling information, or the like to support smooth services.

The main functions of the NR PDCP 1d-05 or 1d-40 may include some of the following functions.
  header compression and decompression: ROHC only
  transfer of user data
  sequential transmission (in-sequence delivery of upper layer PDUs)
  non-sequential transmission (out-of-sequence delivery of upper layer PDUs)
  PDCP PDU reordering for reception
  duplicate detection of lower layer SDUs
  retransmission of PDCP SDUs
  ciphering and deciphering
  timer-based SDU discarding in UL In the above, the reordering function of an NR PDCP entity may mean a function of reordering the PDCP PDUs received from the lower layer in order based on a PDCP sequence number (SN). The reordering function of the NR PDCP entity may include a function of transmitting data to the upper layer in the reordered order, may include a function of directly transmitting data without considering the order, may include a function of rearranging the order and recording the missing PDCP PDUs, may include a function of reporting statuses of the missing PDCP PDUs to the transmitting side, and may include a function of requesting retransmission of the missing PDCP PDUs.

The main functions of the NR RLC 1d-10 or 1d-35 may include some of the following functions.
  transfer of upper layer PDUs
  sequential transmission (in-sequence delivery of upper layer PDUs)
  non-sequential transmission (out-of-sequence delivery of upper layer PDUs)
  ARQ function (error correction through ARQ)
  concatenation, segmentation and reassembly of RLC SDUs
  re-segmentation of RLC data PDUs
  reordering of RLC data PDUs
  duplicate detection
  protocol error detection
  RLC SDU discarding
  RLC re-establishment In the above, the sequential transmission (in-sequence delivery) function of the NR RLC entity may mean a function of sequentially transmitting the RLC SDUs received from the lower layer to the upper layer. When one original RLC SDU is divided into multiple RLC SDUs and then received, the sequential transmission (in-sequence delivery) function of the NR RLC entity may include a function of reassembling and then transmitting the same.

The sequential transmission (in-sequence delivery) function of the NR RLC entity may include a function of rearranging the received RLC PDUs based on the RLC SN or the PDCP SN, may include a function of rearranging the order and recording the missing RLC PDUs, may include a function of reporting statuses of the missing RLC PDUs to the transmitting side, and may include a function of requesting retransmission of the missing RLC PDUs.

The sequential transmission (in-sequence delivery) function of the NR RLC entity may include a function of sequentially transmitting, when there is a missing RLC SDU, only the RLC SDUs up to before the missing RLC SDU to the upper layer. Also, the sequential transmission (in-sequence delivery) function of the NR RLC entity may include a function of sequentially transmitting all RLC SDUs received before the start of a timer to the upper layer, when a preset timer has expired even when there is a missing RLC SDU. Also, the sequential transmission (in-sequence delivery) function of the NR RLC entity may include a function of sequentially transmitting all RLC SDUs received up to now to the upper layer, when a preset timer has expired even when there is a missing RLC SDU.

The NR RLC entity may process the RLC PDUs in order of reception regardless of the order of the SN (out-of-sequence delivery) and transmit the processed RLC PDUs to the NR PDCP entity.

In the case of receiving segments, the NR RLC entity may receive segments stored in a buffer or to be received afterward, reconfigure the segments into a single RLC PDU, and then transmit the same to the NR PDCP entity.

The NR RLC layer may not include the concatenation function, and this function may be performed in the NR MAC layer or may be replaced with the multiplexing function of the NR MAC layer.

In the above, the non-sequential transmission (out-of-sequence delivery) function of the NR RLC entity may mean a function of directly transmitting the RLC SDUs received from the lower layer to the upper layer regardless of the order thereof. When one original RLC SDU is divided into multiple RLC SDUs and then received, the non-sequential transmission (out-of-sequence delivery) function of the NR RLC entity may include a function of reassembling and then transmitting the same. The non-sequential transmission (out-of-sequence delivery) function of the NR RLC entity may include a function of storing the RLC SN or PDCP SN of the received RLC PDUs, arranging the order thereof, and recording the missing RLC PDUs.

The NR MACs 1d-15 and 1d-30 may be connected to several NR RLC layers of one UE, and the main functions of the NR MAC may include some of the following functions.

mapping between logical channels and transport channels
multiplexing/demultiplexing of MAC SDUs
scheduling information reporting
HARQ function (error correction through HARQ)
priority handling between logical channels of one UE
priority handling between UEs by means of dynamic scheduling
MBMS service identification
transport format selection
padding NR physical (PHY) layers 1d-20 and 1d-25 channel-code and modulate higher-layer data into an OFDM symbol and transmit the OFDM symbol through a radio channel, and demodulate and channel-decode an OFDM symbol received through the radio channel and transmit the result thereof to the upper layer.

Figure 1E:
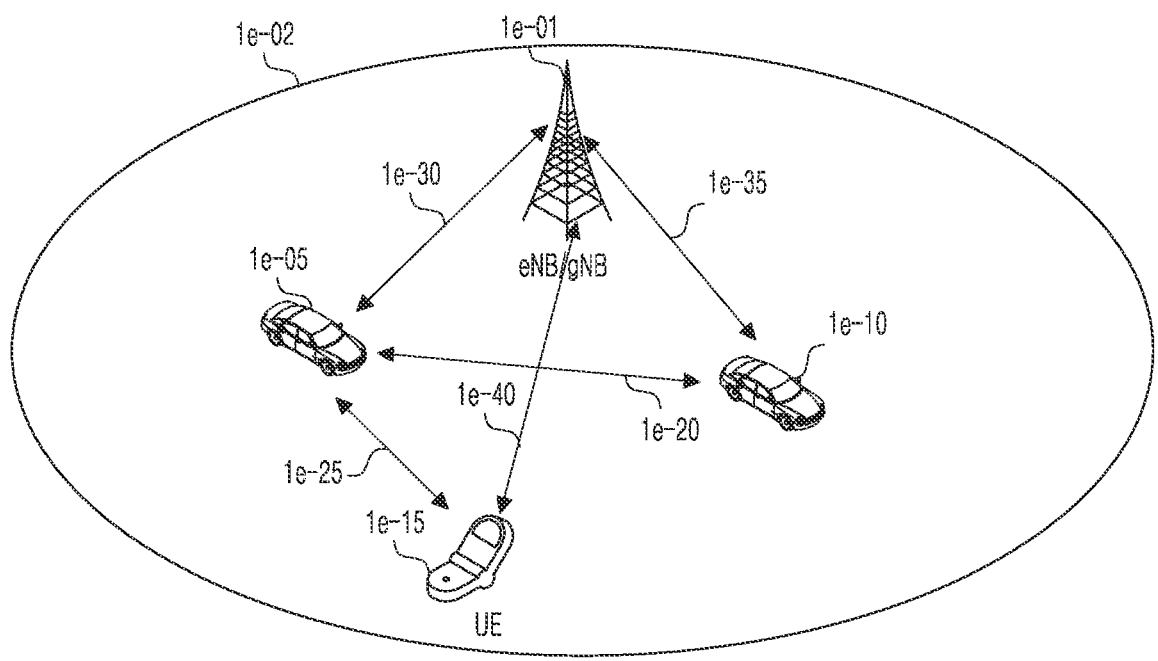
FIG. 1E illustrates vehicle-to-everything (V2X) communication in a mobile communication system, according to an embodiment of the disclosure.
Figure 1E:
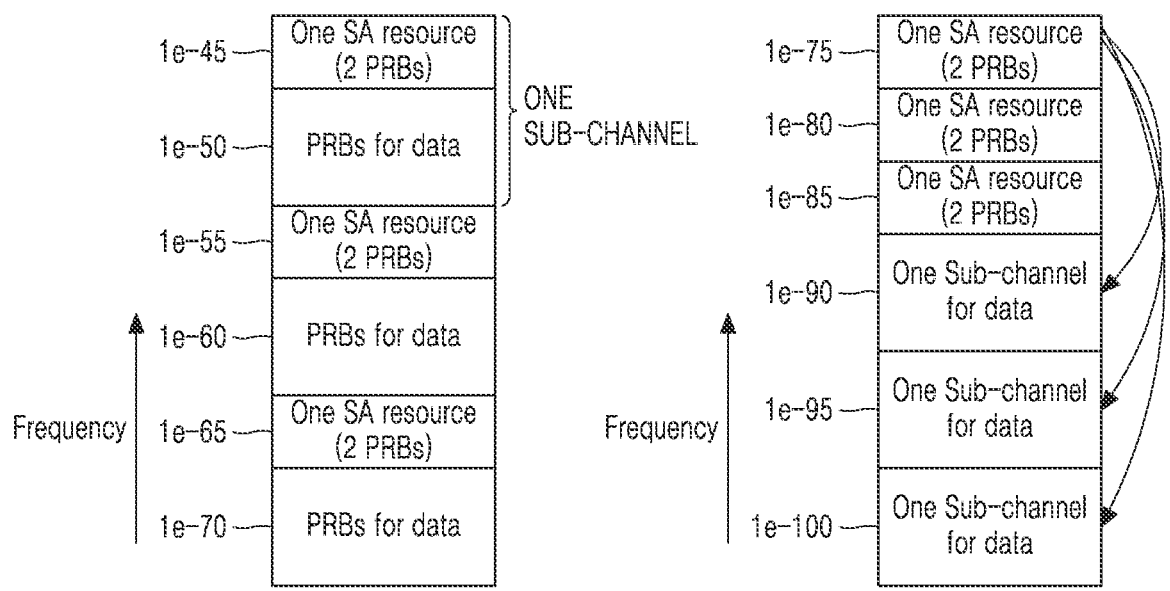

FIG. 1E illustrates vehicle-to-everything (V2X) communication in a mobile communication system, according to an embodiment of the disclosure.

The V2X communication collectively refers to a communication technology through all interfaces with a vehicle, and depending on the form and communication components, examples thereof may include vehicle-to-vehicle (V2V), vehicle-to-infrastructure (V2I), vehicle-to-pedestrian (V2P), or vehicle-to-network (V2N). The V2P and V2V communications basically follow a structure and an operating principle of Rel-13 device-to-device (D2D) communication. That is, the V2P and V2V are based on a sidelink (PC5) operation, and actual data packets may be transmitted and received through a sidelink, which is a transmission channel between UEs, instead of through UL and DL links of a BS and a UE. The basic concept described above may be applied not only to V2X defined in the LTE but also to V2X newly defined in the next-generation mobile communication (NR), and upgrade for particular scenarios may be applied.

An eNB/gNB 1e-01 includes at least one of vehicle UEs 1e-05 and 1e-10 and a pedestrian UE 1e-15 located within a cell 1e-02 supporting the V2X communication. That is, the vehicle UE 1e-05 may perform cellular communication with the eNB/gNB 1e-01 by using vehicle UE-BS links (Uu) 1e-30 and 1e-35, and the P-UE 1e-15 may perform cellular communication by using a P-UE-BS link (Uu) 1e-40. The vehicle UE 1e-05 may perform D2D communication with the other vehicle UE 1e-10 or the P-UE 1e-15 by using sidelinks (PC5) 1e-20 and 1e-25. In the above, the BS may be a gNB or an upgraded eNB supporting NR, and for the vehicle UEs 1e-05 and 1e-10 and the P-UE 1e-15 to directly transmit and receive information by using the sidelinks 1e-20 and 1e-25, a resource pool that is usable for sidelink communication should be allocated. A method, performed by a gNB or an upgraded eNB, of allocating a resource to a UE in V2X of the LTE system will be described below in detail, and a similar approach as in the LTE system may be applied in V2X to be introduced in an NR system. In the NR system, different numerology may be used, and the design of a sidelink resource pool may be changed to some extent.

The method, performed by the gNB or the upgraded eNB, of allocating a resource to the UE based on the V2X of the LTE system may be classified into two methods of a scheduled resource allocation (mode 3) and a UE autonomous resource allocation (mode 4).

The scheduled resource allocation may be a method, performed by the BS, of allocating a resource used for sidelink transmission to RRC-connected UEs via a dedicated scheduling scheme. Because the gNB or the upgraded eNB may manage sidelink resources, the scheduled resource allocation method may be effective for interference management and resource pool management (dynamic allocation, semi-persistence transmission). Also, in the case of the scheduled resource allocation (mode 3) in which the gNB or the upgraded eNB allocates and manages a resource, when there is data to be transmitted to other UEs, an RRC-connected UE may transmit, to the gNB or the upgraded eNB, information indicating that there is data to be transmitted to the other UES by using an RRC message or a MAC control element (hereinafter, CE). In this case, SidelinkUE-Information, UEAssistanceInformation messages may be used as the RRC message. An example of the MAC CE may include a buffer status report MAC CE of a new format (including an indicator indicating a buffer status report for at least V2X communication and information about a size of data buffered for sidelink communication). For detailed formats and content of the buffer status report used in 3GPP, 3GPP standard TS36.321 "E-UTRA MAC Protocol Specification" should be referenced.

The UE autonomous resource allocation may be a resource allocation method in which a gNB or upgraded eNB provides a UE with a sidelink transmission and reception resource pool for V2X as system information, and the UE selects a resource pool according to a predetermined rule. Examples of a method of selecting a resource by the UE may include zone mapping, sensing-based resource selection, random selection, etc. For a structure of a resource pool for V2X, a scheme in which resources 1e-45, 1e-55, and 1e-65 for scheduling allocation (SA) and resources 1e-50, 1e-60, and 1e-70 for data transmission are adjacent to each other to configure a sub-channel, and a scheme in which resources 1e-75, 1e-80, and 1e-85 for SA and resources 1e-90, 1e-95, and 1e-100 for data transmission are not adjacent to each other may be used. Regardless of which of the two structures is used, the SA may be composed of two consecutive PRBs and may include content indicating a location of a resource for data. A plurality of UEs that receive a V2X service may exist in a single cell, and a relationship between the eNB/gNB 1e-01 and the UE 1e-05, 1e-10, or 1e-15 described above may be extended and applied.

Also, in order to transmit and receive sidelink data on a resource pool, the V2X service is basically identified through Destination Layer2 ID (or destination ID) in the V2X of the LTE system. That is, a header of a V2X data packet (i.e., an MAC PDU) transmitted through a sidelink includes Source/Destination Layer2 ID (each having a size of 24 bits) of a UE, and the Destination Layer2 ID indicates the service type of V2X data traffic transmitted by the UE. In this case, the Source Layer2 ID means a unique identifier of the UE. When another UE having received Destination Layer2 ID transmitted by a transmitting UE is subscribed to and configured to receive a service for the corresponding Destination Layer2 ID, a data packet belonging to a corresponding MAC PDU is decoded and then transmitted to the upper layer. Mapping information about the Destination Layer2 ID and the V2X data packet is transmitted from a V2X server to a V2X control function and provided to the UE.

Figure 1F:
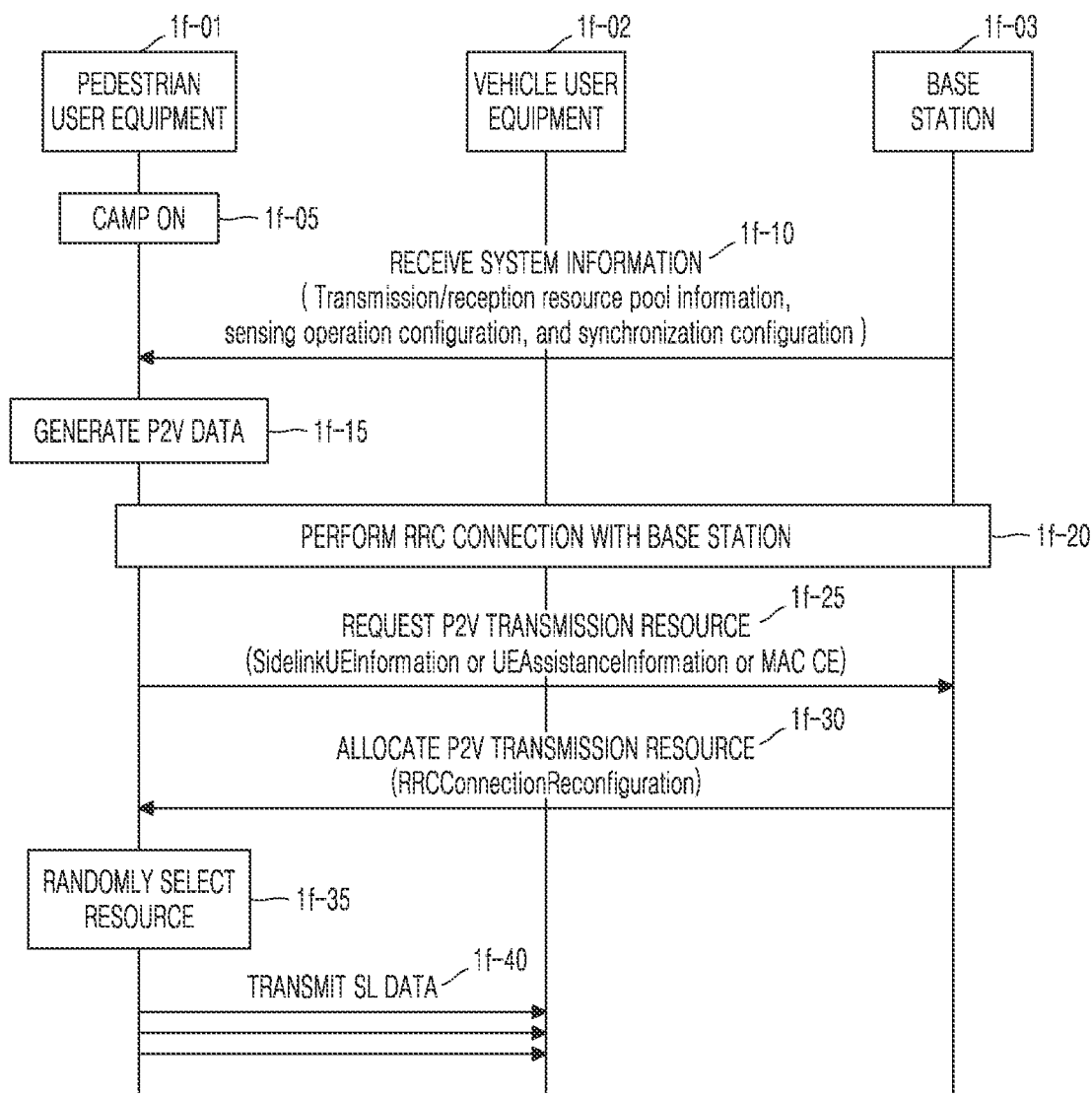
FIG. 1F illustrates a procedure in which a user equipment (UE) selects a random resource when a base station allocates resources to the UE by using a scheduled resource allocation method, according to an embodiment of the disclosure.

FIG. 1F illustrates a procedure in which a UE selects a random resource when a BS allocates resources to the UE by using a scheduled resource allocation method, according to an embodiment of the disclosure.

Referring to FIG. 1F, in V2P communication, a BS 1f-03 may allocate a resource pool for random resource selection and a pool for resource selection through partial sensing for a P-UE 1f-01. The P-UE 1f-01 should have sidelink reception capability to perform a partial sensing operation.

Accordingly, considering that a P-UE 1f-01 without sidelink Rx capability exists in a cell, the BS may provide the P-UE 1f-01 with a resource pool for random selection of at least one resource.

The P-UE 1f-01 that is camped on (operation 1f-05) may receive, from the BS 1f-03, system information (SIB21, SIB22, or SIBx to be newly defined for vehicle communication) (operation 1f-10). The system information received by the P-UE 1f-01 may include resource pool information for transmission and reception, configuration information for a sensing operation, information for synchronization configuration, or the like.

The P-UE 1f-01 may generate data traffic for pedestrian-to-vehicle (P2V) communication (operation 1f-15) and may perform an RRC connection with the BS 1f-03 (operation 1f-20). An RRC connection process between the P-UE 1f-01 and the BS 1f-03 maybe performed before the P-UE 1f-01 generates the data traffic (operation 1f-15).

The P-UE 1f-01 may request the BS 1f-03 for a transmission resource capable of performing P2V communication with other vehicle UEs 1f-02 (operation 1f-25). In this regard, the P-UE 1f-01 may request the BS 1f-03 for a transmission resource capable of performing P2V communication by using an RRC message or an MAC CE. In this case, SidelinkUEInformation, UEAssistanceInformation messages may be used as the RRC message. An example of the MAC CE may include a buffer status report MAC CE of a new format (including an indicator indicating a buffer status report for at least V2P communication and information about a size of data buffered for D2D communication).

The BS 1f-03 may allocate a P2V transmission resource to the P-UE 1f-01 through a dedicated RRC message (operation 1f-30). The dedicated RRC message may be included in an RRCConnectionReconfiguration message.

The P-UE 1f-01 may randomly select a resource in a time/frequency domain from among the resources allocated from the BS 1f-03 (operation 1f-35), and transmit data to the vehicle UE 1f-02 by using the selected resource in the time/frequency domain (operation 1f-40).

Figure 1G:
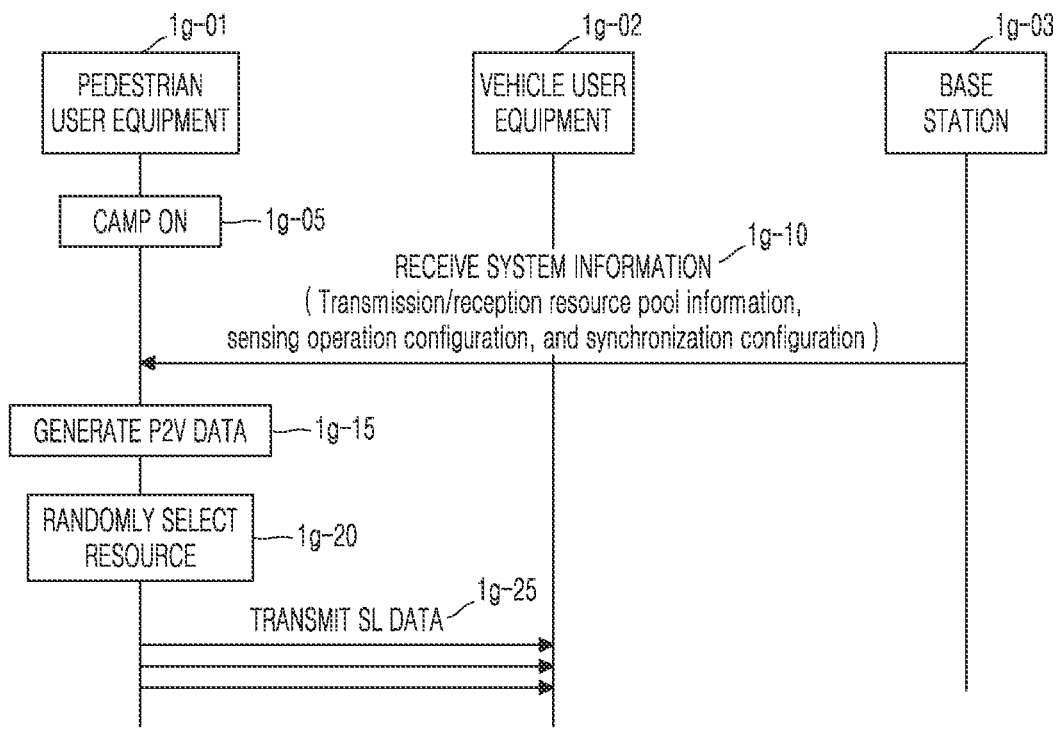
FIG. 1G illustrates a procedure in which a UE selects a random resource when a base station allocates resources to the UE by using a UE autonomous resource allocation method, according to an embodiment of the disclosure.

FIG. 1G illustrates a procedure in which a UE selects a random resource when a BS allocates resources to the UE by using a UE autonomous resource allocation method, according to an embodiment of the disclosure.

Unlike a scheduled resource allocation mode (mode 3) in which a BS 1g-03 directly participates in resource allocation, in an operation of a UE autonomous resource allocation mode (mode 4), a P-UE 1g-01 autonomously selects a resource based on a resource pool pre-received via system information and transmits data. In V2P communication, the BS 1g-03 may allocate a resource pool for random resource selection and a pool for resource selection through partial sensing for the P-UE 1g-01. The P-UE 1g-01 should have sidelink Rx capability to perform a partial sensing operation. Accordingly, considering that a P-UE 1g-01 without sidelink Rx capability exists in a cell, the BS may provide the P-UE with a resource pool for random selection of at least one resource. The P-UE 1g-01 that is camped on (operation 1g-05) may receive, from the BS 1g-03, system information (SIB21, SIB22, or SIBx to be newly defined for vehicle communication) (operation 1g-10). The system information that the P-UE 1g-01 receives from the BS 1g-03 may include resource pool information for transmission and reception, configuration information for a sensing operation, information for synchronization configuration, or the like. The P-UE 1g-01 may generate data traffic for P2V communication (operation 1g-15), select a pool in which a resource is randomly selectable, from among resource pools received via system information from the BS 1g-03 and randomly select a resource in a time/frequency domain (operation 1g-20). The P-UE 1g-01 may transmit data to a vehicle UE 1g-02 by using the selected resource in the time/frequency domain (operation 1g-25).

Figure 1H:
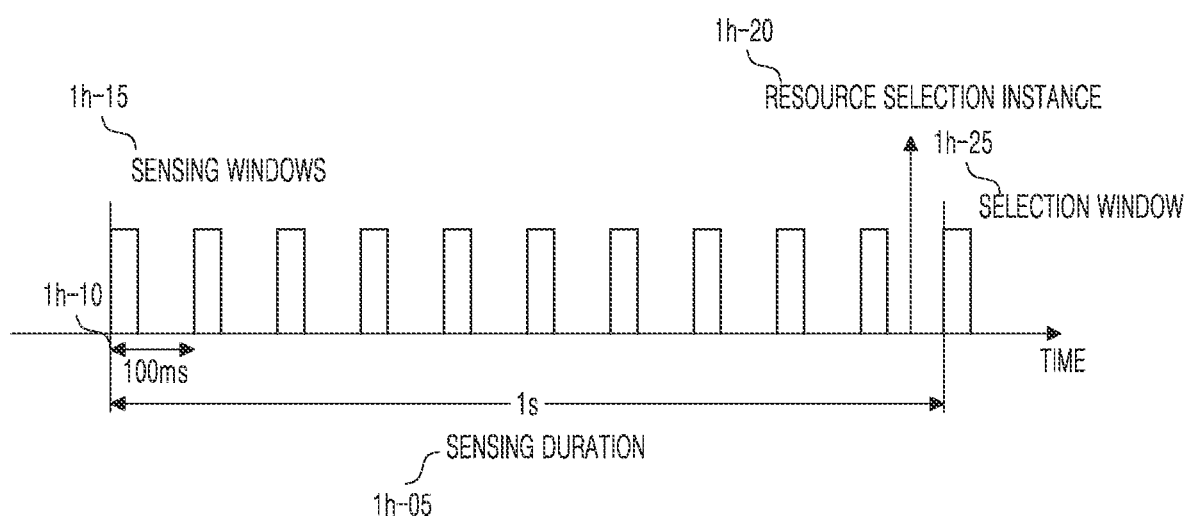
FIG. 1H illustrates a partial sensing operation of a pedestrian UE in vehicle-to-pedestrian (V2P) communication, according to an embodiment of the disclosure.

FIG. 1H illustrates a partial sensing operation of a UE in V2P communication.

Referring to FIG. 1H, a P-UE (or P2V-UE) may perform a random resource selection operation or a partial sensing operation for data transmission and reception. The P-UE may repeat an operation of sensing nearby resources only for a certain period of time at a 100 ms cycle during a corresponding sensing duration 1h-05 without using a 1-second sensing window which is used in an existing sensing operation. In this case, a sensing window 1h-15 may have a size of about 10 ms. The P-UE may select a resource in operation 1h-20 by reflecting a result of the sensing operation, which is measured 10 times during the sensing duration 1h-05. That is, as the result of the sensing operation, the P-UE may select an empty resource except for resources occupied by other UEs. Also, the P-UE may transmit SA and related data on a predetermined resource via a selection window in operation 1h-25. The partial sensing operation may be performed only for a P-UE having sidelink Rx capability.

In the next-generation mobile communication system, by enabling vehicles to communicate with other vehicles, infrastructure, roadside base stations (road side units (hereinafter, RSUs)), users on roads, etc., the V2P communication is expected to support use cases of vulnerable road users to enhance driver safety and facilitate autonomous driving. Technical requirements for the V2P communication to support the use cases of the vulnerable road users in the NR or 5G system may be as follows.

1. Determination of timing for V2P signal transmission and timing for V2P signal reception to reduce power consumption of a pedestrian UE (hereinafter, referred to as a P-UE) (wherein the P-UE collectively refers to mobile UEs of pedestrians, cyclists, motorcyclists, people with physical disabilities, people with limited mobility due to regional limitations, or the like).

2. Positioning accuracy: a collision warning message requiring accuracy within a range of about 50 cm to about 1 m, an awareness message requiring accuracy within a range of about 1 m to about 5 m.

3. Pedestrian judgement using a localized base station (localized infrastructure) (e.g., a surveillance camera or a localized base station equipped with radio technology) equipped with infrastructure or multi-access edge computing (MEC) functions, and cooperative pedestrian judgement through vehicle-to-vehicle communication.

In the disclosure, a method, performed by a P-UE, of transmitting and receiving a V2P signal with the assistance of a BS/vehicle UE in order to support the use cases of the vulnerable road users.

Figure 1I:
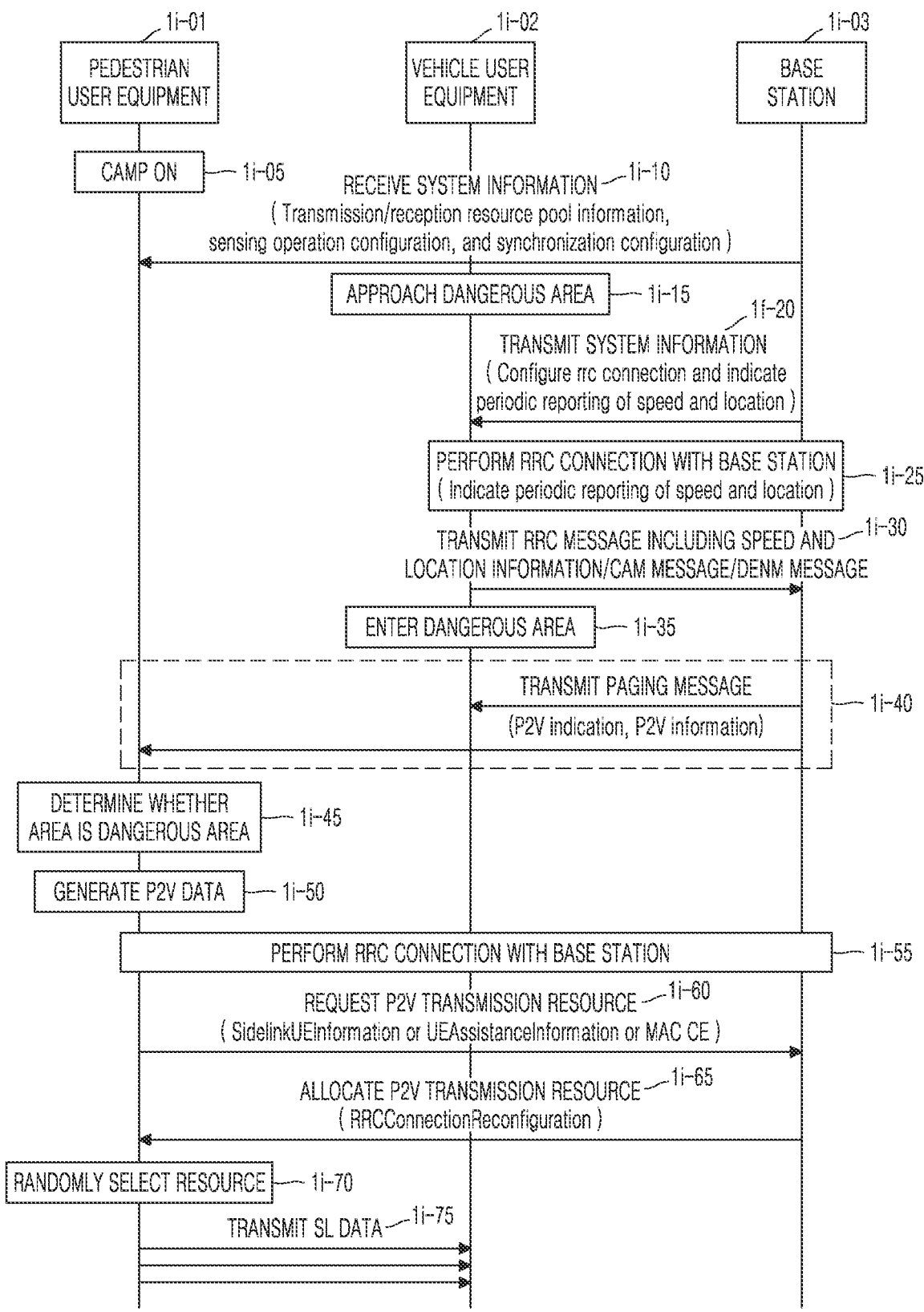
FIG. 1I illustrates a method, performed by a pedestrian UE, of transmitting and receiving a V2P signal with the assistance of a base station/vehicle UE to reduce power consumption of the pedestrian UE in V2P communication, according to an embodiment of the disclosure.

FIG. 1I illustrates a method, performed by a P-UE, of transmitting and receiving a V2P signal with the assistance of a BS/vehicle UE to reduce power consumption of the P-UE in V2P communication, according to an embodiment of the disclosure.

Referring to FIG. 1I, a P-UE 1i-01 may camp on an LTE cell or an NR cell (operation 1i-05) and may receive, from a BS 1i-03, system information (SIB21, SIB22, or SIBx to be newly defined for vehicle communication) (operation 1i-10). In the disclosure, an eNB, a gNB, or an RSU are collectively defined as a BS. The system information that the P-UE 1i-01 receives from the BS 1i-03 may include resource pool information for transmission and reception, configuration information for a sensing operation, information for synchronization configuration, or the like.

When a vehicle UE 1*i*-02 approaches a dangerous area while moving (operation 1*i*-15), the BS 1*i*-03 may indicate the vehicle UE 1*i*-02 to configure an RRC connection with the BS 1*i*-03 and periodically report speed and location via system information of a cell including the dangerous area (operation 1*i*-20). In the disclosure, roads susceptible to accidents, such as near intersections or high-speed driveways where blind spots exist may be defined as dangerous areas, and roads with increased vehicle traffic or increased vehicle speed may be defined as dangerous areas.

The vehicle UE 1*i*-02 having received the system information may configure an RRC connection with the BS 1*i*-03 (operation 1*i*-25) and periodically report, to the BS 1*i*-03, speed, location, and the like via an RRC message, a cooperative awareness message (CAM), or a decentralized environmental notification message (DENM) including speed and location information (operation 1*i*-30). The RRC message may include a LocationInfo information element (IE) including a location (LocationCoordinates) or speed (e.g., horizontalVelocity) of a vehicle UE.

When the moving vehicle UE 1*i*-02 periodically reports a message including speed or location information to the BS 1*i*-03 (operation 1*i*-30) and enters the dangerous area (operation 1*i*-35), the BS 1*i*-03 belonging to the dangerous area may transmit a paging message to the vehicle UE 1*i*-02 and the P-UE 1*i*-01 (operation 1*i*-40). The paging message may include a P2V indication indicating that the area is a dangerous area or indicating P2V/V2P signal transmission and P2V information including information about the dangerous area. Also, the paging message may be transmitted only from BSs located in dangerous areas, such as BSs near intersections, BSs near high-speed driveways, etc. Moreover, when the P-UE 1*i*-01 supports an inactive mode, by configuring the dangerous area as an RAN area, the paging message may be transmitted only from the configured RAN area.

Without performing operations 1*i*-15, 1*i*-20, 1*i*-25, and 1*i*-30, when the vehicle UE 1*i*-02 enters a preset dangerous area in operation 1*i*-30, the BS 1*i*-03 in the preset dangerous area may also transmit the paging message to the vehicle UE 1*i*-02 and the P-UE 1*i*-01 only in the corresponding area (operation 1*i*-40).

When the P-UE 1*i*-01 having received the paging message determines that it is in the dangerous area (operation 1*f*-45), the P-UE 1*i*-01 may perform a series of processes to transmit a P2V signal to the vehicle UE 1*i*-02. The P-UE 1*i*-01 may generate P2V data to inform a nearby vehicle UE 1*i*-02 of the presence of a pedestrian (operation 1*i*-50), and then may perform an RRC connection with the BS when operating in the scheduled resource allocation mode (mode 3) (operation 1*i*-55). An RRC connection process may be performed before the P2V data is generated (operation 1*i*-50). The P-UE 1*i*-01 may request the BS 1*i*-03 for a transmission resource capable of performing P2V communication with other vehicle UEs 1*i*-02 (operation 1*i*-60). In this regard, the P-UE 1*i*-01 may request the BS for a transmission resource capable of performing P2V communication by using an RRC message or an MAC CE. In this case, SidelinkUEInformation, UEAssistanceInformation messages may be used as the RRC message. An example of the MAC CE may include a buffer status report MAC CE of a new format (including an indicator indicating a buffer status report for at least V2P communication and information about a size of data buffered for D2D communication).

The BS 1*i*-03 may allocate a P2V transmission resource to the P-UE 1*i*-01 through a dedicated RRC message (operation 1*i*-65). The dedicated RRC message may be included in an RRCConnectionReconfiguration message. The P-UE 1*i*-01 may randomly select a source in a time/frequency domain from among resources indicated by the BS 1*i*-03 (operation 1*i*-70) and transmit P2V data to the vehicle UE 1*i*-02 (operation 1*i*-75). The vehicle UE 1*i*-02 having received the P2V data may drive by using the P2V data (e.g., marking a location of a P-UE on a navigation device) or transmit the P2V data received from the P-UE 1*i*-01 to another nearby vehicle UE.

The P-UE 1*i*-01 may generate P2V data to inform the nearby vehicle UE 1*i*-02 of the presence of a pedestrian (operation 1*i*-50), and then, when operating in the UE autonomous resource allocation mode (mode 4), without performing operations 1*i*-55, 1*i*-60, and 1*i*-65, may select a pool in which a resource is randomly selectable, from among resource pools received via system information from the BS 1*i*-03 and randomly select the source in the time/frequency domain (operation 1*i*-70). The P-UE 1*i*-01 may transmit the P2V data to the vehicle UE 1*i*-02 by using the selected source in the time/frequency domain (operation 1*i*-75). The vehicle UE 1*i*-02 having received the P2V data may drive by using the P2V data (e.g., marking a location of a P-UE on a navigation device) or transmit the P2V data received from the P-UE 1*i*-01 to another nearby vehicle UE 1*i*-02.

When the P-UE 1*i*-01 determines that it is not in the dangerous area (operation 1*i*-45), the P-UE 1*i*-01 may not transmit a P2V signal to the vehicle UE 1*i*-02.

Figure 1J:
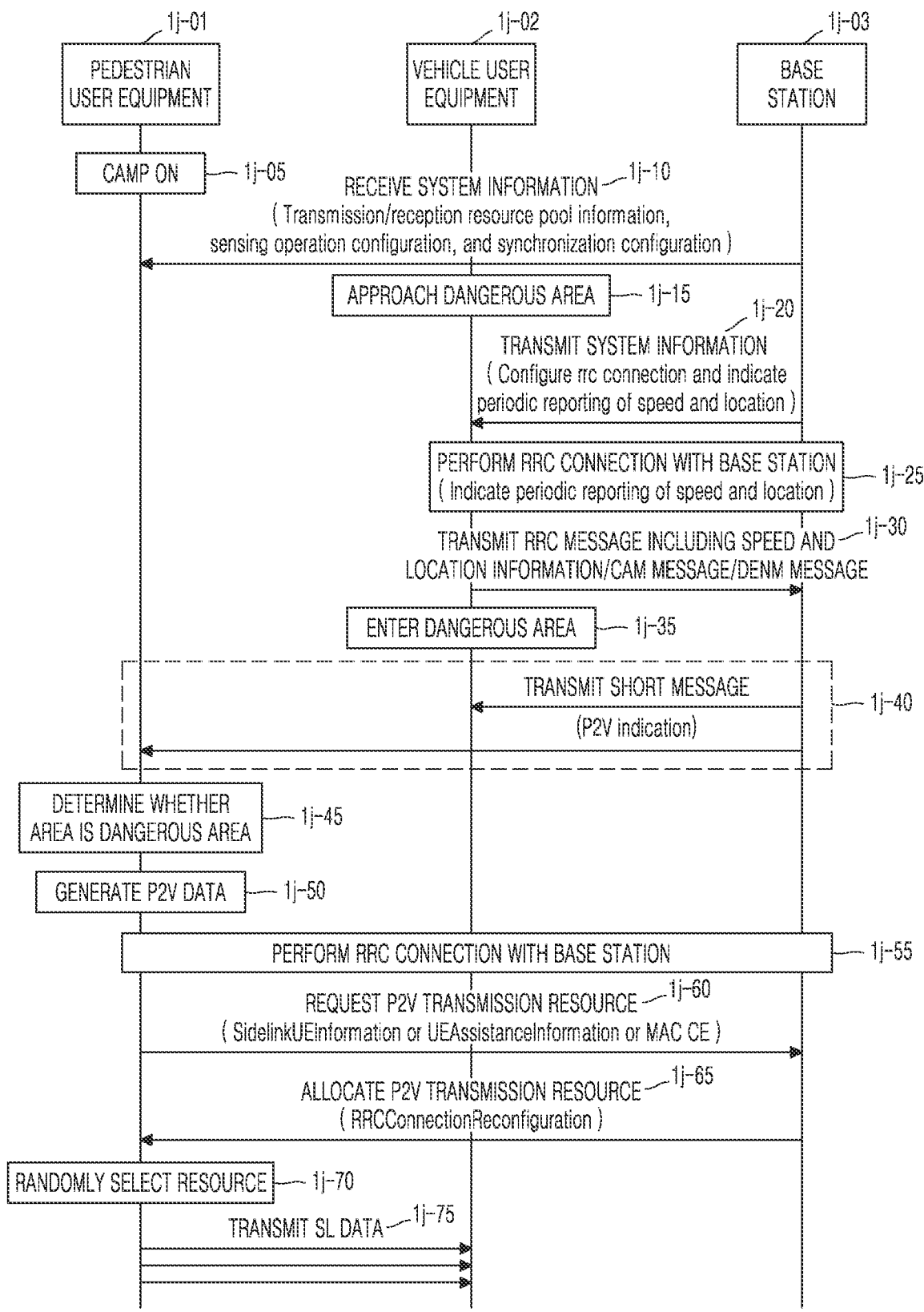
FIG. 1J illustrates a method, performed by a pedestrian UE, of transmitting and receiving a V2P signal with the assistance of a base station/vehicle UE to reduce power consumption of the pedestrian UE in V2P communication, according to an embodiment of the disclosure.

FIG. 1J illustrates a method, performed by a P-UE, of transmitting and receiving a V2P signal with the assistance of a BS/vehicle UE to reduce power consumption of the P-UE in V2P communication, according to an embodiment of the disclosure.

Referring to FIG. 1J, a P-UE 1*j*-01 may be camped on in an LTE cell or an NR cell (operation 1*j*-05) and may receive, from a BS 1*j*-03, system information (SIB21, SIB22, or SIBx to be newly defined for vehicle communication) (operation 1*j*-10). In the disclosure, an eNB, a gNB, or an RSU are collectively defined as a BS. The system information that the P-UE 1*j*-01 receives from the BS 1*j*-03 may include resource pool information for transmission and reception, configuration information for a sensing operation, information for synchronization configuration, or the like.

When a vehicle UE 1*j*-02 approaches a dangerous area while moving (operation 1*j*-15), the BS 1*j*-03 may indicate the vehicle UE 1*j*-02 to configure an RRC connection with the BS 1*j*-03 and periodically report speed and location via system information of a cell including the dangerous area (operation 1*j*-20). In the disclosure, roads susceptible to accidents, such as near intersections or high-speed driveways where blind spots exist may be defined as dangerous areas, and roads with increased vehicle traffic or increased vehicle speed may be defined as dangerous areas.

The vehicle UE 1*j*-02 having received the system information may configure an RRC connection with the BS (operation 1*j*-25) and periodically report, to the BS 1*j*-03, speed, location, and the like via an RRC message, a CAM, or a DENM including speed and location information (operation 1*j*-30). The RRC message may include a LocationInfo IE including a location (LocationCoordinates) or speed (e.g., horizontal Velocity) of a vehicle UE.

When the moving vehicle UE 1*j*-02 periodically reports a message including speed or location information to the BS 1*j*-03 (operation 1*j*-30) and enters the dangerous area (operation 1*j*-35), the BS 1*j*-03 belonging to the dangerous area may transmit a short message to the vehicle UE 1j-02 and the P-UE 1j-01 (operation 1j-40). In the disclosure, the short message may be defined as follows.

Short messages can be transmitted on PDCCH using P-RNTI with or without associated Paging message using Short message field in DCI formal 1_0. The below table defines Short messages. Bit 1 is the most significant bit.

| Bit | Short message |
| --- | --- |
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | p2vIndication<br>If set to 1: indication of danger zone or P2V/V2P transmission |
| 4 [8] | Not used in this release of the specification, and shall be ignored by UE if received. |

Also, the short message may be transmitted only from BSs located in dangerous areas, such as BSs near intersections, BSs near high-speed driveways, etc. Moreover, when the P-UE supports an inactive mode, by configuring the dangerous area as an RAN area, the short message may be transmitted only from the configured RAN area.

Without performing operations 1j-15, 1j-20, 1j-25, and 1j-30, when the vehicle UE 1j-02 enters a preset dangerous area in operation 1j-30, the BS 1j-03 in the preset dangerous area may also transmit the short message to the vehicle UE 1j-02 and the P-UE 1j-01 only in the corresponding area (operation 1j-40).

When the P-UE 1j-01 having received the short message determines that it is in the dangerous area (operation 1j-45), the P-UE 1j-01 may perform a series of processes to transmit a P2V signal to the vehicle UE 1j-02. The P-UE 1j-01 may generate P2V data to inform a nearby vehicle UE 1j-02 of the presence of a pedestrian (operation 1j-50), and then may perform an RRC connection with the BS when operating in the scheduled resource allocation mode (mode 3) (operation 1j-55). An RRC connection process may be performed before the P2V data is generated (operation 1j-50). The P-UE 1j-01 may request the BS 1j-03 for a transmission resource capable of performing P2V communication with other vehicle UEs 1j-02 (operation 1j-60). In this regard, the P-UE 1j-01 may request the BS for a transmission resource capable of performing P2V communication by using an RRC message or an MAC CE. In this case, SidelinkUEInformation and/or UEAssistanceInformation messages may be used as the RRC message. An example of the MAC CE may include a buffer status report MAC CE of a new format (including an indicator indicating a buffer status report for at least V2P communication and information about a size of data buffered for D2D communication). The BS 1j-03 may allocate a P2V transmission resource to the P-UE 1j-01 through a dedicated RRC message (operation 1j-65). The dedicated RRC message may be included in an RRCConnectionReconfiguration message. The P-UE 1j-01 may randomly select a source in a time/frequency domain from among resources indicated by the BS 1j-03 (operation 1j-70) and transmit data to the vehicle UE 1j-02 (operation 1j-75). The vehicle UE 1j-02 having received the P2V data may drive by using the P2V data (e.g., marking a location of a P-UE on a navigation device) or transmit the P2V data received from the P-UE 1j-01 to another nearby vehicle UE.

The P-UE 1j-01 may generate P2V data to inform the nearby vehicle UE 1j-02 of the presence of a pedestrian (operation 1j-50), and then, when operating in the UE autonomous resource allocation mode (mode 4), without performing operations 1j-55, 1j-60, and 1j-65, may select a pool in which a resource is randomly selectable, from among resource pools received via system information from the BS 1j-03 and randomly select the source in the time/frequency domain (operation 1j-70). The P-UE 1j-01 may transmit the P2V data to the vehicle UE 1j-02 by using the selected source in the time/frequency domain (operation 1j-75). The vehicle UE 1j-02 having received the P2V data may drive by using the P2V data (e.g., marking a location of a P-UE on a navigation device) or transmit the P2V data received from the P-UE 1j-01 to another nearby vehicle UE 1j-02.

When the P-UE 1i-01 determines that it is not in the dangerous area (operation 1j-45) or has not received the short message (operation 1j-40), the P-UE 1i-01 may not transmit a P2V signal to the vehicle UE 1j-02.

FIG. 1K illustrates a method, performed by a P-UE, of transmitting and receiving a V2P signal with the assistance of a BS/vehicle UE to reduce power consumption of the P-UE in V2P communication, according to an embodiment of the disclosure.

Referring to FIG. 1K, a P-UE 1k-01 may be camped on in an LTE cell or an NR cell (operation 1k-05) and may receive, from a BS 1k-03, system information (SIB21, SIB22, or SIBx to be newly defined for vehicle communication) (operation 1k-10). In the disclosure, an eNB, a gNB, or an RSU are collectively defined as a BS. The system information that the P-UE 1k-01 receives from the BS 1k-03 may include resource pool information for transmission and reception, configuration information for a sensing operation, information for synchronization configuration, or the like.

When a vehicle UE 1k-02 approaches a dangerous area while moving (operation 1k-15), the BS 1k-03 may indicate the vehicle UE 1k-02 to configure an RRC connection with the BS 1k-03 and periodically report speed and location via system information of a cell including the dangerous area (operation 1k-20). In the disclosure, roads susceptible to accidents, such as near intersections or high-speed driveways where blind spots exist may be defined as dangerous areas, and roads with increased vehicle traffic or increased vehicle speed may be defined as dangerous areas.

The vehicle UE 1k-02 having received the system information may configure an RRC connection with the BS (operation 1k-25) and periodically report, to the BS 1k-03, speed, location, and the like via an RRC message, a CAM, or a DENM including speed and location information (operation 1k-30). The RRC message may include a LocationInfo IE including a location (LocationCoordinates) or speed (e.g., horizontal Velocity) of a vehicle UE.

When the moving vehicle UE 1k-02 periodically reports a message including speed or location information to the BS 1k-03 (operation 1k-30) and enters the dangerous area (operation 1k-35), the BS 1k-03 belonging to the dangerous area may transmit a short message and a paging message to the vehicle UE 1k-02 and the P-UE 1k-01 (operation 1k-40). The short message transmitted by the BS 1k-03 may correspond to the short message transmitted by the BS 1j-03 in FIG. 1J. The paging message transmitted by the BS 1k-03 may include information (e.g., PCIRange) about the dangerous area. Also, the short message or the paging message may be transmitted only from BSs located in dangerous areas, such as BSs near intersections, BSs near high-speed driveways, etc. Moreover, when the P-UE supports an inactive mode, by configuring the dangerous area as an RAN area, the paging message may be transmitted only from the configured RAN area.

Without performing operations 1k-15, 1k-20, 1k-25, and 1k-30, when the vehicle UE 1k-02 enters a preset dangerous area in operation 1k-30, the BS 1k-03 in the preset dangerous area may also transmit the short message and the paging message to the vehicle UE 1k-02 and the P-UE 1k-01 only in the corresponding area (operation 1k-40).

When the P-UE 1k-01 having received the short message and the paging message determines that it is in the dangerous area (operation 1k-45), the P-UE 1k-01 may perform a series of processes to transmit a P2V signal to the vehicle UE 1k-02. The P-UE 1k-01 may generate P2V data to inform a nearby vehicle UE 1k-02 of the presence of a pedestrian (operation 1k-50), and then may perform an RRC connection with the BS when operating in the scheduled resource allocation mode (mode 3) (operation 1k-55). An RRC connection process may be performed before the P2V data is generated (operation 1k-50). The P-UE 1k-01 may request the BS 1k-03 for a transmission resource capable of performing P2V communication with other vehicle UEs 1k-02 (operation 1k-60). In this regard, the P-UE 1k-01 may request the BS for a transmission resource capable of performing P2V communication by using an RRC message or an MAC CE. In this case, SidelinkUEInformation and/or UEAssistanceInformation messages may be used as the RRC message. An example of the MAC CE may include a buffer status report MAC CE of a new format (including an indicator indicating a buffer status report for at least V2P communication and information about a size of data buffered for D2D communication).

The BS 1k-03 may allocate a P2V transmission resource to the P-UE 1k-01 through a dedicated RRC message (operation 1k-65). The dedicated RRC message may be included in an RRCConnectionReconfiguration message. The P-UE 1k-01 may randomly select a source in a time/frequency domain from among resources indicated by the BS 1k-03 (operation 1k-70) and transmit P2V data to the vehicle UE 1k-02 (operation 1k-75). The vehicle UE 1k-02 having received the P2V data may drive by using the P2V data (e.g., marking a location of a P-UE on a navigation device) or transmit the P2V data received from the P-UE 1k-01 to another nearby vehicle UE.

The P-UE 1k-01 may generate P2V data to inform the nearby vehicle UE 1k-02 of the presence of a pedestrian (operation 1k-50), and then, when operating in the UE autonomous resource allocation mode (mode 4), without performing operations 1k-55, 1k-60, and 1k-65, may select a pool in which a resource is randomly selectable, from among resource pools received via system information from the BS 1k-03 and randomly select the source in the time/frequency domain (operation 1k-70). The P-UE 1k-01 may transmit the P2V data to the vehicle UE 1k-02 by using the selected source in the time/frequency domain (operation 1k-75). The vehicle UE 1k-02 having received the P2V data may drive by using the P2V data (e.g., marking a location of a P-UE on a navigation device) or transmit the P2V data received from the P-UE 1k-01 to another nearby vehicle UE 1k-02.

When the P-UE 1k-01 determines that it is not in the dangerous area (operation 1k-45) or has not received the short message or the paging message (operation 1k-40), the P-UE 1k-01 may not transmit a P2V signal to the vehicle UE 1k-02.

Figure 1L:
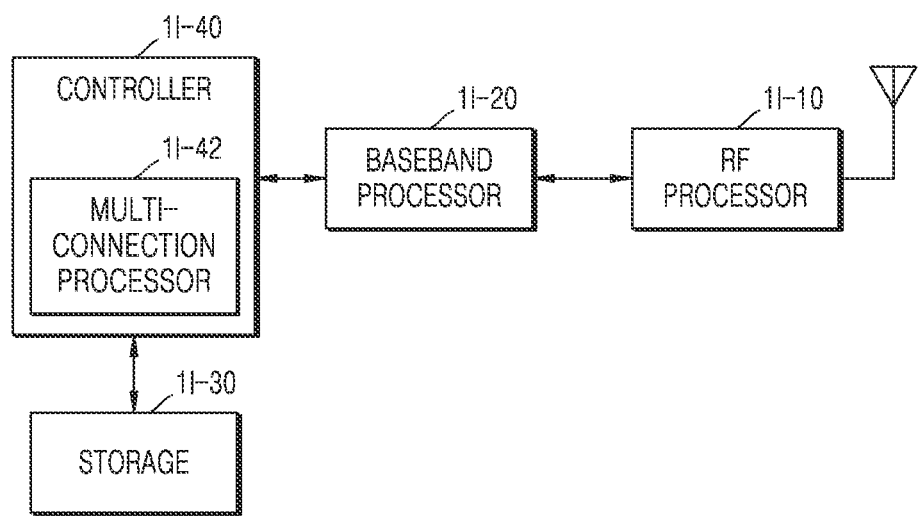
FIG. 1L illustrates a structure of a UE, according to an embodiment of the disclosure.

FIG. 1L illustrates a structure of a UE, according to an embodiment of the disclosure.

The UE may include a radio frequency (RF) processor 1l-10, a baseband processor 1l-20, a storage 1l-30, and a controller 1l-40.

According to an embodiment of the disclosure, the RF processor 1l-10 may perform functions for transmitting and receiving signals through radio channels, such as band conversion and amplification of signals. That is, the RF processor 1l-10 may up-convert a baseband signal provided from the baseband processor 1l-20 into an RF band signal and transmit the same through an antenna and may down-convert an RF band signal received through the antenna into a baseband signal. For example, the RF processor 1l-10 may include a transmission filter, a reception filter, an amplifier, a mixer, an oscillator, a digital-to-analog converter (DAC), and an analog-to-digital converter (ADC).

Although only one antenna is illustrated in FIG. 1L, the UE may include a plurality of antennas.

Also, the RF processor 1l-10 may include a plurality of RF chains. In addition, the RF processor 1l-10 may perform beamforming. For beamforming, the RF processor 1l-10 may adjust the phase and magnitude of each of the signals transmitted and received through a plurality of antennas or antenna elements. Also, the RF processor 1l-10 may perform MIMO, and when a MIMO operation is performed, the RF processor 1l-10 may receive several layers. Under the control of the controller 1l-40, the RF processor 1l-10 may perform reception beam sweeping by suitably configuring a plurality of antennas or antenna elements or may adjust the direction and width of a reception beam so that the reception beam may be coordinated with a transmission beam.

The baseband processor 1l-20 may perform a conversion function between a baseband signal and a bitstream according to the physical layer standard of the system. For example, during data transmission, the baseband processor 1l-20 may generate complex symbols by encoding and modulating a transmission bitstream. Also, during data reception, the baseband processor 1l-20 may restore a reception bitstream by demodulating and decoding the baseband signal provided from the RF processor 1l-10. For example, according to an OFDM scheme, during data transmission, the baseband processor 1l-20 may generate complex symbols by encoding and modulating a transmission bitstream, map the complex symbols to subcarriers, and then configure OFDM symbols through an inverse fast Fourier transform (IFFT) operation and cyclic prefix (CP) insertion. Also, during data reception, the baseband processor 1l-20 may divide the baseband signal provided from the RF processor 1l-10 into OFDM symbol units, restore signals mapped to the subcarriers through a fast Fourier transform (FFT) operation, and then restore a reception bitstream through demodulation and decoding.

The baseband processor 1l-20 and the RF processor 1l-10 may transmit and receive signals as described above. Accordingly, the baseband processor 1l-20 and the RF processor 1l-10 may be referred to as a transmitter, a receiver, a transceiver, or a communicator. In addition, at least one of the baseband processor 1l-20 or the RF processor 1l-10 may include a plurality of communication modules to support a plurality of different radio access technologies. Also, at least one of the baseband processor 1l-20 or the RF processor 1l-10 may include a plurality of communication modules to process signals of different frequency bands. For example, the different radio access technologies may include LTE networks, NR networks, and the like. Also, the different frequency bands may include a super high frequency (SHF) (e.g., 2.2 GHz or 2 GHz) band and a millimeter wave (mmWave) (e.g., 60 GHz) band.

The storage 1l-30 may store data such as a basic program, an application program, or configuration information for operation of the UE. The storage 1*l*-30 may provide the stored data at the request of the controller 1*l*-40.

The controller 1*l*-40 may control overall operations of the UE. For example, the controller 1*l*-40 may transmit and receive signals through the baseband processor 1*l*-20 and the RF processor 1*l*-10. Also, the controller 1*l*-40 may write and read data to and from the storage 1*l*-40. For this purpose, the controller 1*l*-40 may include at least one processor. For example, the controller 1*l*-40 may include a communication processor (CP) for controlling communication, an application processor (AP) for controlling the upper layer, such as an application program or the like.

Figure 1M:
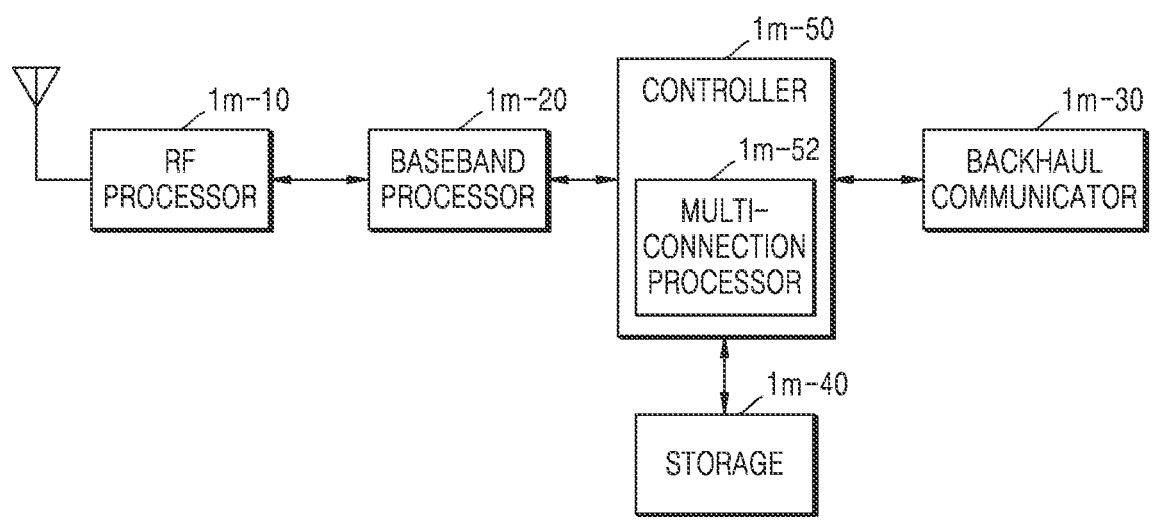
FIG. 1M illustrates a structure of a base station, according to an embodiment of the disclosure.

FIG. 1M illustrates a structure of a BS, according to an embodiment of the disclosure.

According to an embodiment of the disclosure, the BS may include one or more transmission reception points (TRPs).

According to an embodiment of the disclosure, the BS may include an RF processor 1*m*-10, a baseband processor 1*m*-20, a backhaul communicator 1*m*-30, a storage 1*m*-40, and a controller 1*m*-50.

The RF processor 1*m*-10 may perform functions for transmitting and receiving signals through radio channels, such as band conversion and amplification of signals. That is, the RF processor 1*m*-10 may up-convert a baseband signal provided from the baseband processor 1*m*-20 into an RF band signal and transmit the same through an antenna and may down-convert an RF band signal received through the antenna into a baseband signal. For example, the RF processor 1*m*-10 may include a transmission filter, a reception filter, an amplifier, a mixer, an oscillator, a DAC, and an ADC.

Although only one antenna is illustrated in FIG. 1M, the BS may include a plurality of antennas.

Also, the RF processor 1*m*-10 may include a plurality of RF chains. In addition, the RF processor 1*m*-10 may perform beamforming. For beamforming, the RF processor 1*m*-10 may adjust the phase and magnitude of each of the signals transmitted and received through a plurality of antennas or antenna elements. The RF processor 1*m*-10 may transmit one or more layers to perform a downlink MIMO operation.

The baseband processor 1*m*-20 may perform a conversion function between a baseband signal and a bitstream according to the physical layer standard of a first radio access technology. For example, during data transmission, the baseband processor 1*m*-20 may generate complex symbols by encoding and modulating a transmission bitstream. Also, during data reception, the baseband processor 1*m*-20 may restore a reception bitstream by demodulating and decoding the baseband signal provided from the RF processor 1*m*-10. For example, according to the OFDM scheme, during data transmission, the baseband processor 1*m*-20 may generate complex symbols by encoding and modulating a transmission bitstream, map the complex symbols to subcarriers, and then configure OFDM symbols through an IFFT operation and CP insertion. Also, during data reception, the baseband processor 1*m*-20 may divide the baseband signal provided from the RF processor 1*m*-10 into OFDM symbol units, restore signals mapped to the subcarriers through an FFT operation, and then restore a reception bitstream through demodulation and decoding. The baseband processor 1*m*-20 and the RF processor 1*m*-10 may transmit and receive signals as described above.

Accordingly, the baseband processor 1*m*-20 and the RF processor 1*m*-10 may be referred to as a transmitter, a receiver, a transceiver, a communicator, or a wireless communicator.

The communicator 1*m*-30 may provide an interface for communicating with other nodes in the network. That is, the communicator 1*m*-30 may convert a bitstream transmitted from a main BS to another node, e.g., an auxiliary BS or a core network, into a physical signal, and convert a physical signal received from another node into a bitstream.

The storage 1*m*-40 may store data such as a basic program, an application program, or configuration information for operation of the main BS. In particular, the storage 1*m*-40 may store information about a bearer allocated to a connected UE, a measurement result reported from the connected UE, or the like. Also, the storage 1*m*-40 may store information that is a reference for determining whether to provide or terminate multiple connections to the UE. The storage 1*m*-40 may provide the stored data at the request of the controller 1*m*-50.

The controller 1*m*-50 may control overall operations of the main BS. For example, the controller 1*m*-50 may transmit and receive signals through the baseband processor 1*m*-20 and the RF processor 1*m*-10 or through the communicator 1*m*-30. Also, the controller 1*m*-50 may write and read data into and from the storage 1*m*-40. For this purpose, the controller 1*m*-50 may include at least one processor.

Figure 2A:
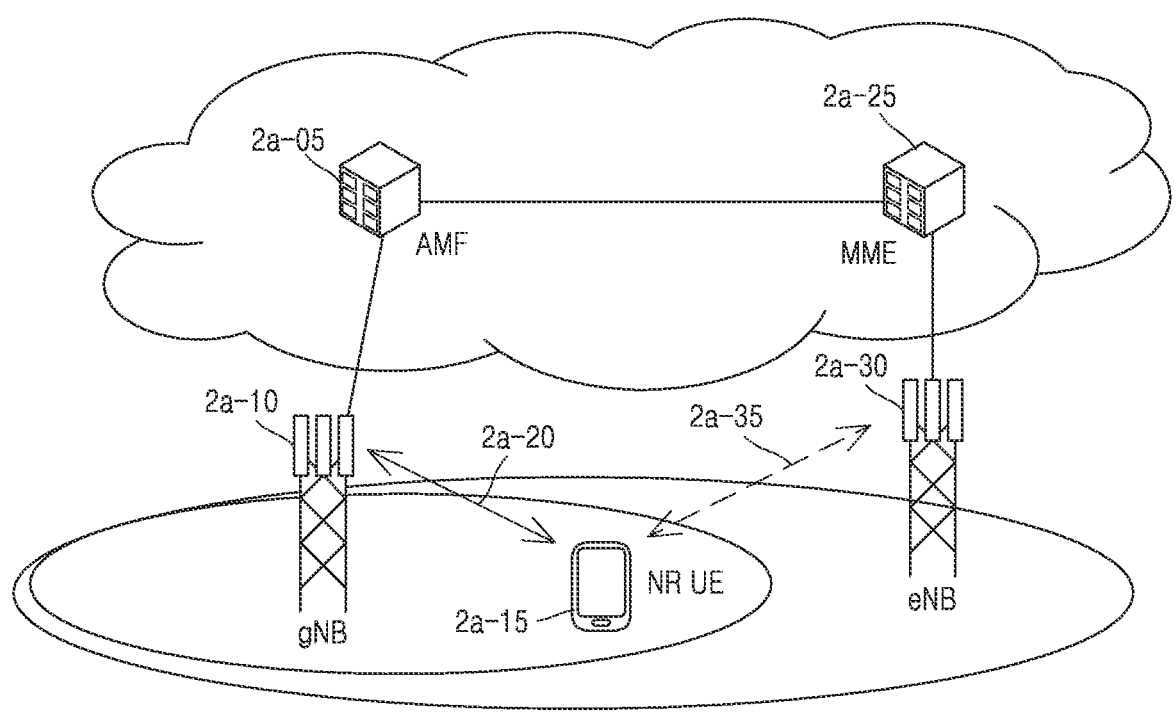
FIG. 2A illustrates a structure of a next-generation mobile communication system, according to an embodiment of the disclosure.

FIG. 2A illustrates a structure of a next-generation mobile communication system.

Referring to FIG. 2A, a radio access network (RAN) of the next-generation mobile communication (New Radio, NR) system may include an NR node B (hereinafter, referred to as a gNB) 2*a*-10 and an access and mobility management function (AMF) 2*a*-05 (a new radio core network). A new radio user equipment (hereinafter, referred to as a NR UE or UE) 2*a*-15 may be connected to an external network through the gNB 2*a*-10 and the AMF 2*a*-05.

In FIG. 2A, the gNB may correspond to an evolved node B (eNB) of an existing LTE system. The gNB is connected to the NR UE through radio channels and may provide superior services compared to an existing Node B. Because all user traffic data is serviced through shared channels in the NR system, an entity for collecting status information such as buffer statuses of UEs, available transmission power statuses, and channel statuses and performing scheduling is required, and such operations may be performed by the gNB 2*a*-10. One gNB may generally control a plurality of cells. The NR or 5G communication system may have a bandwidth greater than the maximum bandwidth of the existing LTE system so as to achieve an ultrahigh data rate, compared to the existing LTE system, and may use OFDM as a radio access technology and may additionally use a beamforming technology. Also, AMC may be used to determine a modulation scheme and a channel coding rate in accordance with a channel status of the NR UE. The AMF 2*a*-05 may perform functions such as mobility support, bearer configuration, and QoS configuration. The AMF 2*a*-05 is an entity for performing various control functions as well as a mobility management function for the NR UE and may be connected to a plurality of base stations. The NR system may cooperate with the existing LTE system, and the AMF 2*a*-05 may be connected to an MME 2*a*-25 through a network interface. The MME 2*a*-25 may be connected to an eNB 2*a*-30 that is an existing BS. A UE supporting LTE-NR dual connectivity may be connected to the eNB, as well as the gNB, to transmit and receive data (operation 2*a*-35).

Figure 2B:
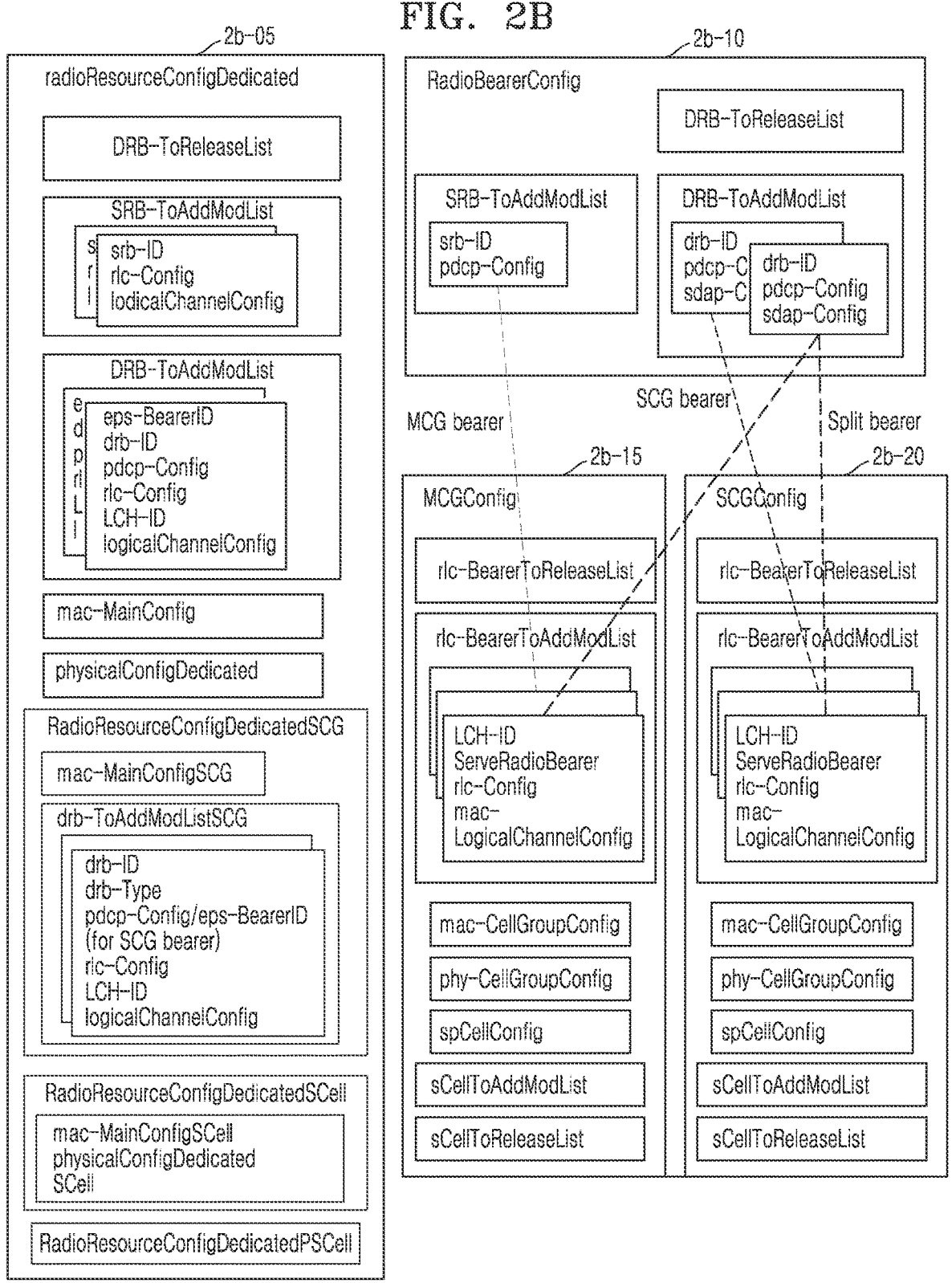
FIG. 2B illustrates a configuration of configuration information in a mobile communication system, according to an embodiment of the disclosure.

FIG. 2B illustrates a configuration of bearer configuration information in a mobile communication system, according to an embodiment of the disclosure. In the disclosure, configuration information necessary for a UE or a BS to use a bearer, for example, configuration information applied to a bearer to use the bearer, is collectively defined as bearer configuration information.

In the LTE system, a bearer (signaling radio bearer (SRB) or data radio bearer (DRB)) may be configured by using an RRCConnectionReconfiguration message 2b-05. SRB-toAddModList and DRB-toAddModList may include configuration information of the SRB and configuration of the DRB, respectively. For example, the DRB-toAddModList may generally include eps-bearerID, drb-ID, pdcp-config, rlc-config, and LCH-ID, logicalChannelConfig. SRB-toReleaseList and DRB-toReleaseList may be used to release the SRB or the DRB. That is, all pieces of DRB-related configuration information may be included in RRCConnectionReconfiguration. In the early LTE system, carrier aggregation and dual connectivity are not supported. With the introduction of the above technologies, new IEs have been defined to configure an SRB and a DRB in a SCell. Also, in dual connectivity, it has been necessary to indicate a bearer type. Accordingly, the RRCConnectionReconfiguration message currently has a very complex structure.

From the initial version of the NR system, an RRC signaling structure has been designed in consideration of supporting carrier aggregation, dual connectivity, and a central unit-distributed unit (CU-DU) structure. Therefore, compared to the existing system, the NR system has an RRC signaling structure which is easier to understand and is more efficient.

In the NR system, when configuring the bearer (SRB or DRB), the existing SRB-toAddModList and DRB-toAddModList IEs are used. However, unlike before, the SRB-toAddModList and the DRB-toAddModList IEs may include only SRB ID for the SRB or DRB ID for the DRB, and configuration information related to a PDCP layer and an SDAP layer. The SRB-toAddModList and the DRB-toAddModList may be included in a RadioBearerConfig IE 2b-10.

Bearer configuration information of layers lower than an RLC layer may be provided through a new IE, rlc-BearerToAddModList. rlc-BearerToAddModList may be configured in cell group units 2b-15 and 2b-20. The rlc-BearerToAddModList may generally include LCH-ID, ServeRadioBearer, rlc-config, and mac-LogicalChannelConfig.

Accordingly, in order to use one SRB or DRB, SRB-toAddModList or DRB-toAddModList, and rlc-BearerToAddModList are required to be configured together, and the SRB-toAddModList or the DRB-toAddModList, and the rlc-BearerToAddModList applied to the one SRB or DRB are required to be mapped to each other.

Figure 2C:
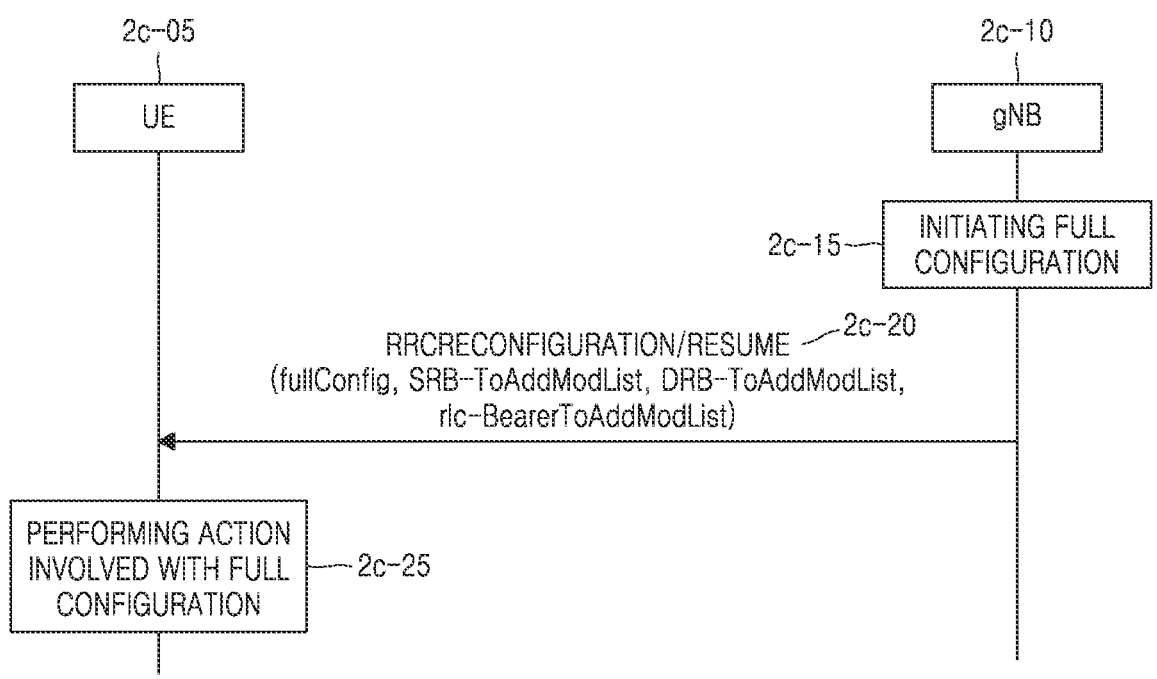
FIG. 2C illustrates a flowchart of a process in which a UE performs a full configuration, according to an embodiment of the disclosure.

FIG. 2C illustrates a flowchart of a process in which a UE performs a full configuration, according to an embodiment of the disclosure.

When a preset condition is satisfied, a gNB 2c-10 may trigger a full configuration to a UE 2c-05 (operation 2c-15). The full configuration may mean that the UE discards the existing bearer configuration information, which has been previously applied, and applies default configuration information or configuration information, which is newly provided by the gNB, to a bearer (SRB, DRB, RLC bearer, and the like). When the UE 2c-05 performs a handover operation, when a target gNB does not understand bearer configuration information by a source gNB, or when the gNB switches to a default configuration information version, instead of an extended configuration information version, for the UE 2c-05, the full configuration may be used.

In more detail, in general, when performing a handover operation for one UE, the source gNB may transmit, to the target gNB, the bearer configuration information which has been provided to the UE. The target gNB may transmit, to the source gNB, only a portion of the received bearer configuration information, which needs to be modified. The source gNB may transmit, to the UE, the modified bearer configuration information to be applied by the target gNB. Such a procedure has the advantage of reducing the amount of information that needs to be transmitted between entities.

However, when the source gNB is a gNB of a higher release version (e.g., 3GPP Rel-10) and the target gNB is a gNB of a lower release version (e.g., 3GPP Rel-8), even though the source gNB transmits, to the target gNB, the bearer configuration information which has been provided to the UE, the target gNB may not be able to interpret the bearer configuration information. As the 3GPP release version increases, new IEs or fields may be added to supplement the existing functions or support new functions. The gNB of the lower release version may not be able to understand the new IEs. Accordingly, in the above case, the target gNB may request the source gNB for a full configuration of the UE and may transmit all necessary pieces of bearer configuration information to the source gNB.

In the disclosure, in consideration of the configuration of the bearer configuration information of the NR system described with reference to FIG. 2B, when the gNB triggers a full configuration to a particular UE by using a preset RRC message (operation 2c-20), the RRC message may include information listed below.

Fullconfig: an indicator indicating to perform a full configuration process

SRB-ToAddModList: a list of SRBs to which specified or default configuration information is applied through a full configuration Both the specified and default configuration information are predefined, and the default configuration information may be modified later by dedicated signaling.

DRB-toAddModList: DRB configuration information to be newly applied through a full configuration Existing DRBs which are not included in the list may be released.

rlc-BearerToAddModList: RLC bearer configuration information to be newly applied through a full configuration Existing RLC bearers which are not included in the list may be released.

A UE having received the preset RRC message including the above information may perform a full configuration (operation 2c-25).

In this case, the SRB-toAddModList may include SRB configuration information to be newly applied through a full configuration.

Figure 2D:
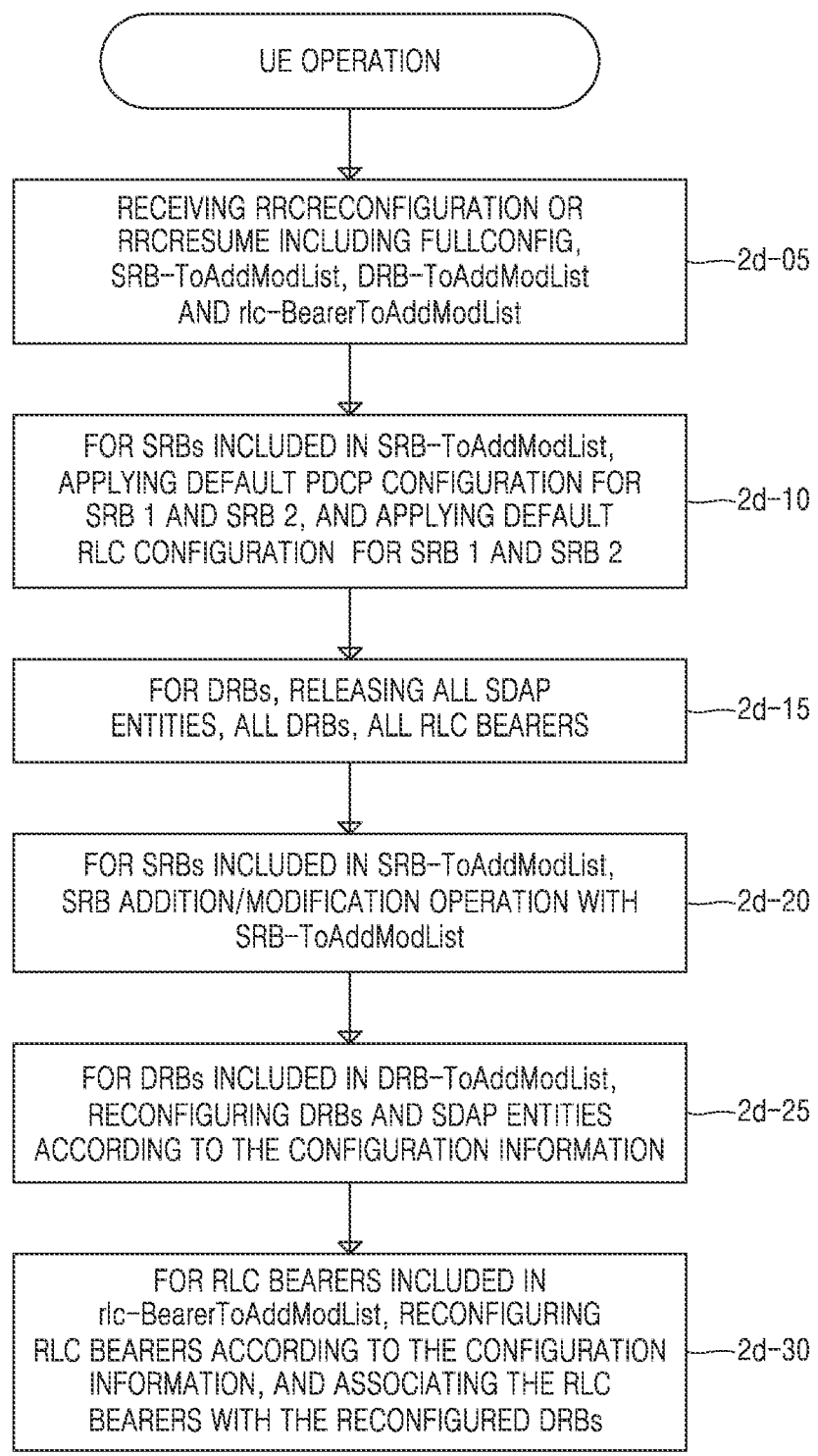
FIG. 2D illustrates a flowchart of an operation of a UE, according to an embodiment of the disclosure.

FIG. 2D illustrates a flowchart of an operation of a UE when the UE performs a full configuration, according to an embodiment of the disclosure.

In operation 2d-05, the UE may receive a preset RRC message, an RRCReconfiguration message from a gNB. The RRC message may include fullConfig, SRB-toAddModList, DRB-toAddModList, and rlc-BearerToAddModList.

In operation 2d-10, the UE may apply a specified configuration for SRBs included in the SRB-toAddModList. Also, the UE may apply default PDCP configuration information, default RLC configuration information, and default physical channel configuration information, for the SRBs included in the SRB-toAddModList. For example, a list of the default RLC configuration information and the default physical channel configuration information may be as follows. For each piece of information in the following list, a predefined default value may exist.

| Name |
| --- |
| RLC configuration CHOICE |
| ul-RLC-Config |
| >t-PollRetransmit |
| >pollPDU |
| >pollByte |
| >maxRetxThreshold |
| dl-RLC-Config |
| >t-Reordering |
| >t-StatusProhibit |
| >enableStatusReportSN-Gap |
| Logical channel configuration |
| priority |
| prioritisedBitRate |
| bucketSizeDuration |
| logicalChannelGroup |
| logicalChannelSR-Prohibit |

As another example, a list of the default RLC configuration information and the default physical channel configuration information may be as follows. For each piece of information in the following list, a predefined default value may exist.

| Name |
| --- |
| RLC configuration CHOICE |
| ul-RLC-Config |
| >t-PollRetransmit |
| >pollPDU |
| >pollByte |
| >maxRetxThreshold |
| dl-RLC-Config |
| >t-Reordering |
| >t-StatusProhibit |
| Logical channel configuration |
| priority |
| prioritisedBitRate |
| bucketSizeDuration |
| logicalChannelGroup |

As another example, the UE may release SDAP entities, PDCP entities, RLCs, logical channels, and SRB IDs for configured SRBs, and then may reconfigure the SRBs by using configuration information included in the SRB-toAddModList and the rlc-BearerToAddModList.

In operation 2d-15, the UE may release SDAP entities, PDCP entities, RLCs, logical channels (DTCHs, etc.), and DRB IDs for configured DRBs. In the disclosure, when performing a full configuration, the UE may also first release SDAP configuration information. Thereafter, the UE may reconfigure DRBs indicated in the DRB-toAddModList by using SDAP configuration information stored in the DRB-toAddModList.

In operation 2d-20, the UE may reconfigure the SRBs included in the SRB-toAddModList by using configuration information included in the SRB-toAddModList. The configuration information included in the SRB-toAddModList may include SRB IDs, SDAP entity configuration information, and PDCP entity configuration information. Operation 2d-20 may be excluded from the entire process.

In operation 2d-25, the UE may reconfigure the DRBs included in the DRB-toAddModList by using configuration information included in the DRB-toAddModList. The configuration information included in the DRB-toAddModList may include DRB IDs, SDAP entity configuration information, and PDCP entity configuration information.

In operation 2d-30, the UE may reconfigure RLC bearers included in the rlc-BearerToAddModList by using configuration information included in the rlc-BearerToAddModList. The configuration information included in the rlc-BearerToAddModList may include logical channel IDs, RLC entity configuration information, and mac-logicalChannelConfig. Also, by using a servedRadioBearer field included in the rlc-BearerToAddModList, mapping information for the reconfigured DRBs, SRBs, or RLC bearers may be provided.

Figure 2E:
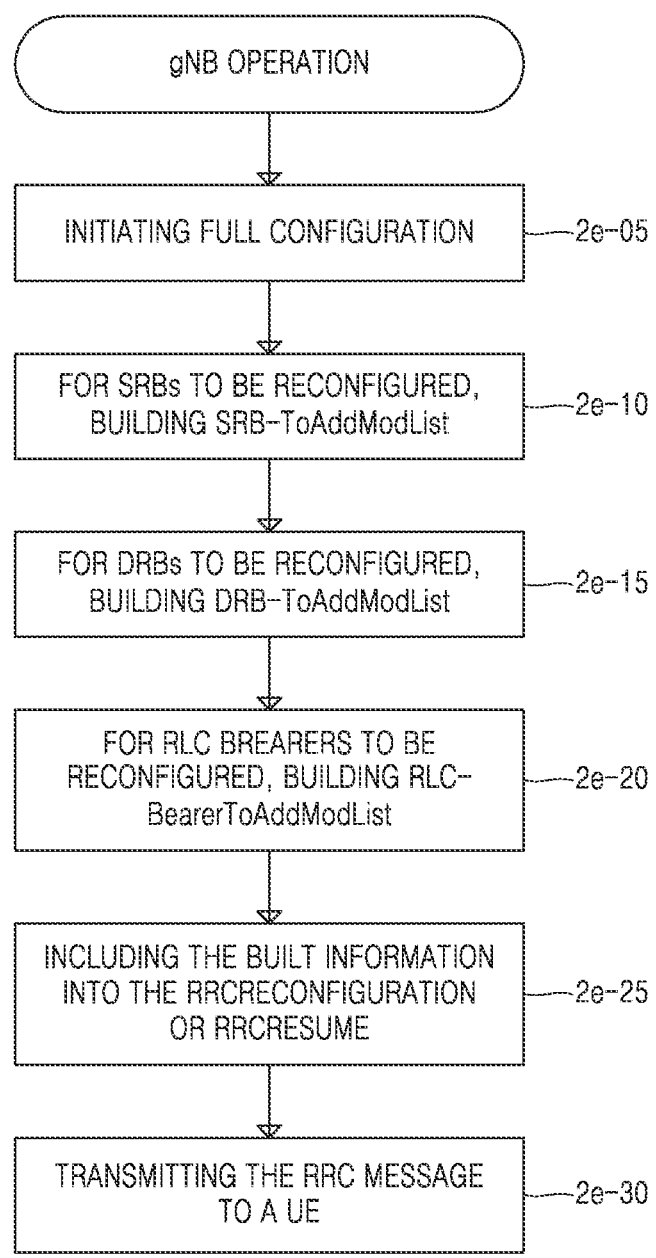
FIG. 2E illustrates a flowchart of an operation of a base station, according to an embodiment of the disclosure.

FIG. 2E illustrates a flowchart of an operation of a gNB when a UE performs a full configuration, according to an embodiment of the disclosure.

In operation 2e-05, the gNB may trigger a full configuration for a particular UE.

In operation 2e-10, the gNB may build SRB-toAddModList for SRBs to be reconfigured with specified/default configuration information (or reconfigured with new configuration information).

In operation 2e-15, the gNB may build DRB-toAddModList for DRBs to be reconfigured with new configuration information. DRBs to be released during a full configuration process of the UE may not be included in the DRB-toAddModList.

In operation 2e-20, the gNB may build rlc-BearerToAddModList for RLC bearers to be reconfigured with new configuration information. RLC bearers that are not mapped to any SRBs or DRBs during the full configuration process of the UE may not be included in the rlc-BearerToAddModList.

In operation 2e-25, the gNB may include the built information (SRB-toAddModList, DRB-toAddModList, and R1c-BearerToAddModList) into an RRCReconfiguration or RRCResume message.

In operation 2e-30, the gNB may transmit an RRC message (the RRCReconfiguration message or the RRCResume message) to the UE.

According to an embodiment of the disclosure, in the full configuration process, the UE may sequentially perform a first operation and a second operation for SRBs and may sequentially perform a third operation and a fourth operation for DRBs.

Figure 2F:
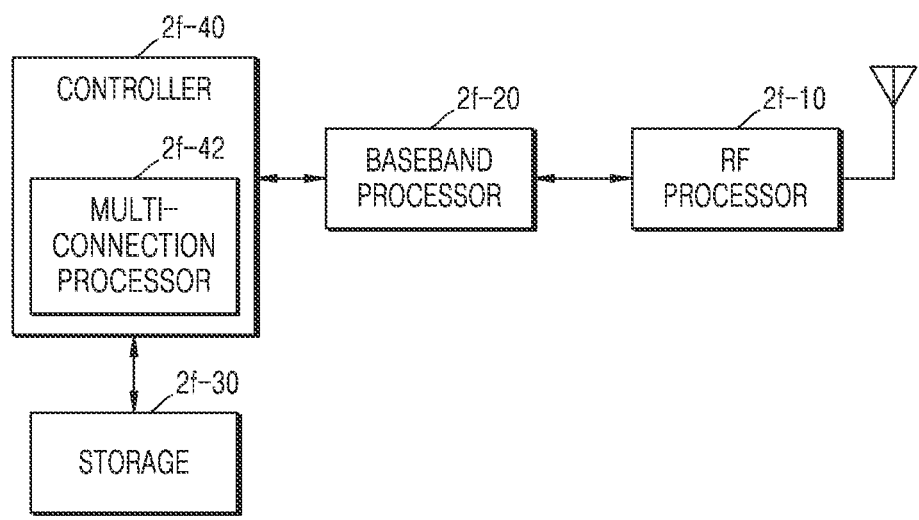
FIG. 2F illustrates a block diagram of a structure of a UE, according to an embodiment of the disclosure.

The first operation may be as follows.
Apply default PDCP configuration for SRB 1 and SRB 2
Apply default RLC configuration for SRB 1 and SRB 2
The second operation may be as follows.
SRB addition/modification operation
The third operation may be as follows.
Release RLC entities of all logicalChannelIdentities serving DRBs
Release logical channels of all logicalChannelIdentities serving DRBs
Release PDCP entities of all drb-Identities
Release SDAP entities associated with all drb-Identities
The fourth operation may be as follows.
DRB addition/modification operation FIG. 2F illustrates a block diagram of a structure of a UE, according to an embodiment of the disclosure.

The UE includes an RF processor 2f-10, a baseband processor 2f-20, a storage 2f-30, and a controller 2f-40.

The RF processor 2f-10 performs functions for transmitting and receiving signals through radio channels, such as band conversion and amplification of signals. That is, the RF processor 2f-10 up-converts a baseband signal provided from the baseband processor 2f-20 into an RF band signal and transmits the same through an antenna and down-converts an RF band signal received through the antenna into a baseband signal. For example, the RF processor 2f-10 may include a transmission filter, a reception filter, an amplifier, a mixer, an oscillator, a DAC, and an ADC. Although only one antenna is illustrated in FIG. 2F, the UE may include a plurality of antennas. Also, the RF processor 2f-10 may include a plurality of RF chains. In addition, the RF processor 2f-10 may perform beamforming. For beamforming, the RF processor 2f-10 may adjust the phase and magnitude of each of the signals transmitted and received through a plurality of antennas or antenna elements. Also, the RF processor may perform MIMO, and when a MIMO operation is performed, the RF processor may receive several layers.

The baseband processor 2f-20 performs a conversion function between a baseband signal and a bitstream according to the physical layer standard of the system. For example, during data transmission, the baseband processor 2f-20 generates complex symbols by encoding and modulating a transmission bitstream. Also, during data reception, the baseband processor 2f-20 restores a reception bitstream by demodulating and decoding the baseband signal provided from the RF processor 2f-10. For example, according to an OFDM scheme, during data transmission, the baseband processor 2f-20 generates complex symbols by encoding and modulating a transmission bitstream, maps the complex symbols to subcarriers, and then configures OFDM symbols through an IFFT operation and CP insertion. Also, during data reception, the baseband processor 2f-20 divides the baseband signal provided from the RF processor 2f-10 into OFDM symbol units, restores signals mapped to the subcarriers through a FFT operation, and then restores a reception bitstream through demodulation and decoding.

The baseband processor 2f-20 and the RF processor 2f-10 transmit and receive signals as described above. Accordingly, the baseband processor 2f-20 and the RF processor 2f-10 may be referred to as a transmitter, a receiver, a transceiver, or a communicator. In addition, at least one of the baseband processor 2f-20 or the RF processor 2f-10 may include a plurality of communication modules to support a plurality of different radio access technologies. Also, at least one of the baseband processor 2f-20 or the RF processor 2f-10 may include a plurality of communication modules to process signals of different frequency bands. For example, different radio access technologies may include a wireless local area network (LAN) (e.g., IEEE 802.11), a cellular network (e.g., LTE), and the like. Also, the different frequency bands may include a SHF (e.g., 2.NRHz or NRhz) band and an mmWave (e.g., 60 GHz) band.

The storage 2f-30 stores data such as a basic program, an application program, or configuration information for operation of the UE. In particular, the storage 2f-30 may store information related to a second connection node that performs wireless communication by using a second radio access technology. Also, the storage 2f-30 provides the stored data at the request of the controller 2f-40.

The controller 2f-40 controls overall operations of the UE. For example, the controller 2f-40 may transmit and receive signals through the baseband processor 2f-20 and the RF processor 2f-10. Also, the controller 2f-40 may write and read data into and from the storage 2f-40. For this purpose, the controller 2f-40 may include at least one processor. For example, the controller 2f-40 may include a CP for controlling communication, an AP for controlling the upper layer, such as an application program or the like.

Figure 2G:
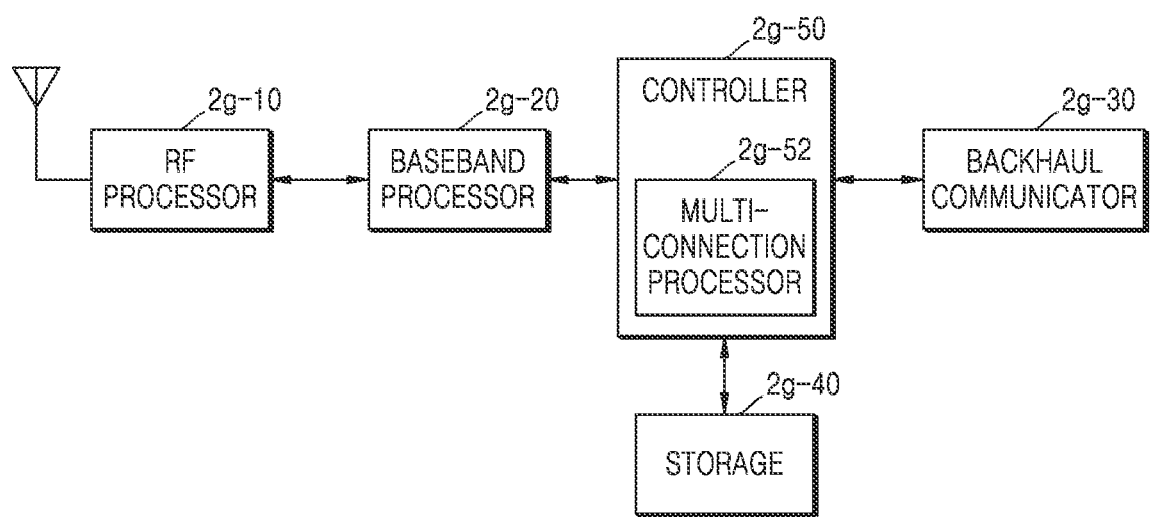
FIG. 2G illustrates a block diagram of a structure of a base station, according to an embodiment of the disclosure.

FIG. 2G illustrates a block diagram of a structure of a BS, according to an embodiment of the disclosure.

The BS may include an RF processor 2g-10, a baseband processor 2g-20, a backhaul communicator 2g-30, a storage 2g-40, and a controller 2g-50.

The RF processor 2g-10 performs functions for transmitting and receiving signals through radio channels, such as band conversion and amplification of signals. That is, the RF processor 2g-10 up-converts a baseband signal provided from the baseband processor 2g-20 into an RF band signal and transmits the same through an antenna and down-converts an RF band signal received through the antenna into a baseband signal. For example, the RF processor 2g-10 may include a transmission filter, a reception filter, an amplifier, a mixer, an oscillator, a DAC, and an ADC. Although only one antenna is illustrated in the drawing, a first connection node may include a plurality of antennas. Also, the RF processor 2g-10 may include a plurality of RF chains. In addition, the RF processor 2g-10 may perform beamforming. For beamforming, the RF processor 2g-10 may adjust the phase and magnitude of each of the signals transmitted and received through a plurality of antennas or antenna elements. The RF processor may transmit one or more layers to perform a downlink MIMO operation.

The baseband processor 2g-20 performs a conversion function between a baseband signal and a bitstream according to the physical layer standard of a first radio access technology. For example, during data transmission, the baseband processor 2g-20 generates complex symbols by encoding and modulating a transmission bitstream. Also, during data reception, the baseband processor 2g-20 restores a reception bitstream by demodulating and decoding the baseband signal provided from the RF processor 2g-10. For example, according to the OFDM scheme, during data transmission, the baseband processor 2g-20 generates complex symbols by encoding and modulating a transmission bitstream, maps the complex symbols to subcarriers, and then configures OFDM symbols through an IFFT operation and CP insertion. Also, during data reception, the baseband processor 2g-20 divides the baseband signal provided from the RF processor 2g-10 into OFDM symbol units, restores signals mapped to the subcarriers through an FFT operation, and then restores a reception bitstream through demodulation and decoding. The baseband processor 2g-20 and the RF processor 2g-10 transmit and receive signals as described above. Accordingly, the baseband processor 2g-20 and the RF processor 2g-10 may be referred to as a transmitter, a receiver, a transceiver, a communicator, or a wireless communicator.

The backhaul communicator 2g-30 provides an interface for communicating with other nodes in the network. That is, the backhaul communicator 2g-30 converts a bitstream transmitted from a main BS to another node, e.g., an auxiliary BS or a core network, into a physical signal, and converts a physical signal received from another node into a bitstream.

The storage 2g-40 stores data such as a basic program, an application program, or configuration information for operation of a main BS. In particular, the storage 2g-40 may store information about a bearer allocated to a connected UE, a measurement result reported from the connected UE, or the like. Also, the storage 2g-40 may store information that is a reference for determining whether to provide or terminate multiple connections to the UE. Also, the storage 2g-40 provides the stored data at the request of the controller 2g-50.

The controller 2g-50 controls overall operations of the main BS. For example, the controller 2g-50 transmits and receives signals through the baseband processor 2g-20 and the RF processor 2g-10 or through the backhaul communicator 2g-30. Also, the controller 2g-50 writes and reads data into and from the storage 2g-40. For this purpose, the controller 2g-50 may include at least one processor.

The methods according to the embodiments of the disclosure described in the claims or specification of the disclosure may be implemented by hardware, software, or a combination of hardware and software.

When the methods are implemented by software, a non-transitory, semi-transitory or transitory computer-readable storage medium storing one or more programs (software modules) may be provided. The one or more programs stored in the non-transitory computer-readable storage medium are configured to be executable by one or more processors included in an electronic device. The one or more programs include instructions that cause an electronic device to execute the methods according to the embodiments of the disclosure set forth in the claims or specification.

Such programs (software modules or software) may be stored in random access memory (RAM), non-volatile memory such as flash memory, read-only memory (ROM), electrically erasable programmable ROM (EEPROM), a magnetic disc storage device, compact disc-ROM (CD-ROM), a digital versatile disc (DVD), other types of optical storage devices, or a magnetic cassette. Alternatively, the programs may be stored in a memory which is a combination of some or all the above storage media. Also, a plurality of such memories may be provided.

Also, the programs may be stored in an attachable storage device that may be accessed through a communication network such as Internet, Intranet, LAN, wide LAN (WLAN), or storage area network (SAN), or through a communication network configured by any combination thereof. Such a storage device may be connected to a device performing embodiments of the disclosure through an external port. In addition, a separate storage device in a communication network may be connected to a device that performs embodiments of the disclosure.

In the above particular embodiments of the disclosure, the components included in the disclosure are expressed in the singular or plural according to the particular embodiments of the disclosure. However, the singular or plural expressions are selected suitably according to the presented situations for convenience of description, the disclosure is not limited to the singular or plural components, and the components expressed in the plural may even be configured in the singular or the components expressed in the singular may even be configured in the plural.

Although embodiments of the disclosure have been described in the detailed description of the disclosure, various modifications may be made therein without departing from the scope of the disclosure. Therefore, the scope of the disclosure is not limited to the embodiments of the disclosure described herein and should be defined by the claims and their equivalents.

The invention claimed is:

1. An operating method of a base station for transmitting and receiving pedestrian-to-vehicle (P2V) data, the operating method comprising:
   identifying that a vehicle user equipment (UE) enters a preset dangerous area;
   in response to identifying that the vehicle UE enters the dangerous area, transmitting a message related to the dangerous area to a pedestrian UE (P-UE);
   receiving, from the P-UE, in response to the message related to the dangerous area, a request for allocation of sidelink resources for transmitting and receiving P2V data to and from the vehicle UE; and
   allocating the sidelink resources to the P-UE,
   wherein the message related to the dangerous area includes a P2V indication indicating that the P-UE is located in the dangerous area or indicating the P-UE to transmit the P2V data.

2. The operating method of claim 1, wherein the message related to the dangerous area comprises a paging message including the P2V indication and information about a location of the dangerous area.

3. The operating method of claim 1, wherein the message related to the dangerous area comprises a short message including the P2V indication.

4. The operating method of claim 1, wherein the message related to the dangerous area comprises a short message including the P2V indication and a paging message including information about a location of the dangerous area.

5. The operating method of claim 1, further comprising:
   when the vehicle UE is located within a preset distance from the dangerous area, requesting the vehicle UE to report at least one of information about a location of the vehicle UE or information about a speed of the vehicle UE; and
   receiving, from the vehicle UE, the at least one of the information about the location of the vehicle UE or the information about the speed of the vehicle UE,
   wherein the identifying that the vehicle UE enters the dangerous area comprises, based on the at least one of the information about the location of the vehicle UE or the information about the speed of the vehicle UE, identifying that the vehicle UE enters the dangerous area.

6. An operating method of a pedestrian user equipment (P-UE) for transmitting and receiving pedestrian-to-vehicle (P2V) data, the operating method comprising:
   receiving, in response to an identification that a vehicle user equipment (UE) enters a preset dangerous area, a message related to the dangerous area from a base station;
   based on the message related to the dangerous area, generating P2V data to be transmitted to the vehicle UE;
   transmitting, to the base station, in response to the message related to the dangerous area, a request for allocation of sidelink resources for transmitting and receiving the P2V data;
   receiving the sidelink resources allocated from the base station; and
   transmitting the P2V data to the vehicle UE on the sidelink resources,
   wherein the message related to the dangerous area includes a P2V indication indicating that the P-UE is located in the dangerous area or indicating the P-UE to transmit the P2V data.

7. The operating method of claim 6, wherein the message related to the dangerous area comprises a paging message including the P2V indication and information about a location of the dangerous area.

8. The operating method of claim 6, wherein the message related to the dangerous area comprises a short message including the P2V indication.

9. The operating method of claim 6, wherein the message related to the dangerous area comprises a short message including the P2V indication and a paging message including information about a location of the dangerous area.

10. The operating method of claim 6, wherein the generating of the P2V data to be transmitted to the vehicle UE comprises:
based on the message related to the dangerous area, identifying that the P-UE is located in the dangerous area, and
in response to identifying that the P-UE is located in the dangerous area, generating the P2V data to inform the vehicle UE of presence of the P-UE.

11. The operating method of claim 6, further comprising:
selecting a sidelink resource to transmit the P2V data from among the allocated sidelink resources,
wherein the transmitting of the P2V data comprises transmitting the P2V data to the vehicle UE on the selected sidelink resource.

12. A base station for transmitting and receiving pedestrian-to-vehicle (P2V) data, the base station comprising:
a transceiver; and
at least one processor connected to the transceiver, wherein the at least one processor is configured to:
identify that a vehicle user equipment (UE) enters a preset dangerous area,
in response to identifying that the vehicle UE enters the dangerous area, transmit a message related to the dangerous area to a pedestrian UE (P-UE)
receive, from the P-UE, in response to the message related to the dangerous area, a request for allocation of sidelink resources for transmitting and receiving P2V data to and from the vehicle UE, and
allocate the sidelink resources to the P-UE,
wherein the message related to the dangerous area includes a P2V indication indicating that the P-UE is located in the dangerous area or indicating the P-UE to transmit the P2V data.

13. The base station of claim 12, wherein the at least one processor is further configured to:
when the vehicle UE is located within a preset distance from the dangerous area, request the vehicle UE to report at least one of information about a location of the vehicle UE or information about a speed of the vehicle UE,
receive, from the vehicle UE, the at least one of the information about the location of the vehicle UE or the information about the speed of the vehicle UE, and
based on the at least one of the information about the location of the vehicle UE or the information about the speed of the vehicle UE, identify that the vehicle UE enters the dangerous area.

14. A pedestrian user equipment (P-UE) for transmitting and receiving pedestrian-to-vehicle (P2V) data, the P-UE comprising:
a transceiver; and
at least one processor connected to the transceiver, wherein the at least one processor is configured to:
receive, in response to an identification that a vehicle user equipment (UE) enters a preset dangerous area, receive a message related to the dangerous area from a base station;
based on the message related to the dangerous area, generate P2V data to be transmitted to the vehicle UE;
transmit, to the base station, in response to the message related to the dangerous area, a request for allocation of sidelink resources for transmitting and receiving the P2V data;
receive the sidelink resources allocated from the base station; and
transmit the P2V data to the vehicle UE on the sidelink resources,.
wherein the message related to the dangerous area includes a P2V indication indicating that the P-UE is located in the dangerous area or indicating the P-UE to transmit the P2V data.

15. The P-UE of claim 14, wherein the at least one processor is further configured to:
select a sidelink resource to transmit the P2V data from among the allocated sidelink resources, and
transmit the P2V data to the vehicle UE on the selected sidelink resource.

* * * * *